United States Patent
Eguchi et al.

(10) Patent No.: US 7,562,736 B2
(45) Date of Patent: Jul. 21, 2009

(54) FUEL INJECTION SYSTEM FOR A SADDLE RIDE TYPE FOUR-WHEEL VEHICLE

(75) Inventors: Masataka Eguchi, Wako (JP); Yuichiro Tsuruta, Wako (JP); Kazuhito Hotta, Wako (JP); Atsushi Ito, Wako (JP); Naoki Urano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 350 days.

(21) Appl. No.: 11/050,016

(22) Filed: Feb. 4, 2005

(65) Prior Publication Data

US 2005/0173918 A1 Aug. 11, 2005

(30) Foreign Application Priority Data

| Feb. 6, 2004 | (JP) | 2004-030833 |
| Mar. 1, 2004 | (JP) | 2004-056653 |
| Mar. 5, 2004 | (JP) | 2004-062421 |

(51) Int. Cl.
*B60K 5/04* (2006.01)
*B60P 3/22* (2006.01)

(52) U.S. Cl. .................. 180/291; 280/835; 280/834

(58) Field of Classification Search ............... 280/834, 280/835; 123/516; 180/291
See application file for complete search history.

(56) References Cited

U.S. PATENT DOCUMENTS

| 2,339,303 | A | * | 1/1944 | Tillery | 220/564 |
| 2,975,713 | A | * | 3/1961 | Wright | 415/98 |
| 4,188,969 | A | * | 2/1980 | Lotton et al. | 137/264 |
| 4,349,002 | A | * | 9/1982 | Allen | 123/557 |
| 4,367,699 | A | * | 1/1983 | Evans | 123/41.23 |
| 4,492,250 | A | * | 1/1985 | Ohmori et al. | 137/590 |
| 5,088,464 | A | * | 2/1992 | Meaney | 123/406.47 |
| 5,134,984 | A | * | 8/1992 | Nonaka et al. | 123/494 |
| 5,330,028 | A | * | 7/1994 | Handa et al. | 180/219 |
| 5,479,909 | A | * | 1/1996 | Blakeslee et al. | 123/491 |
| 5,584,266 | A | * | 12/1996 | Motose et al. | 123/73 A |
| 6,039,029 | A | * | 3/2000 | Nagasaka et al. | 123/442 |
| 7,022,152 | B2 | * | 4/2006 | Tsuruta et al. | 55/385.3 |
| 2001/0027890 | A1 | * | 10/2001 | Bria et al. | 180/291 |
| 2002/0038737 | A1 | * | 4/2002 | Morishita et al. | 180/291 |
| 2003/0074965 | A1 | * | 4/2003 | Okamoto | 73/313 |
| 2004/0079561 | A1 | * | 4/2004 | Ozawa et al. | 180/21 |
| 2004/0129467 | A1 | * | 7/2004 | Tsuruta et al. | 180/68.1 |
| 2004/0255909 | A1 | * | 12/2004 | Kurokawa et al. | 123/472 |
| 2005/0045233 | A1 | * | 3/2005 | Tsuruta | 137/565.17 |
| 2005/0150706 | A1 | * | 7/2005 | Eguchi et al. | 180/291 |
| 2005/0173918 | A1 | * | 8/2005 | Eguchi et al. | 280/834 |

(Continued)

FOREIGN PATENT DOCUMENTS

JP 51-72614 U 6/1976

(Continued)

*Primary Examiner*—Paul N Dickson
*Assistant Examiner*—Daniel Yeagley
(74) *Attorney, Agent, or Firm*—Westerman, Hattori, Daniels & Adrian, LLP.

(57) ABSTRACT

A saddle ride type four-wheel vehicle includes an electronic control type fuel injection system in a fuel supply system for an engine mounted thereon, wherein a fuel pump is disposed on the rear side relative to the rotational center axis of front wheels and on the front side relative to the engine.

3 Claims, 26 Drawing Sheets

U.S. PATENT DOCUMENTS

| | | | |
|---|---|---|---|
| 2005/0263141 A1* | 12/2005 | Tsuruta | 123/516 |
| 2006/0219209 A1* | 10/2006 | Tsuruta et al. | 123/198 E |
| 2006/0219221 A1* | 10/2006 | Tsuruta et al. | 123/469 |
| 2006/0288975 A1* | 12/2006 | Hanafusa | 123/195 C |
| 2007/0023218 A1* | 2/2007 | Koike et al. | 180/219 |
| 2007/0037423 A1* | 2/2007 | Togawa | 439/157 |

FOREIGN PATENT DOCUMENTS

| | | | |
|---|---|---|---|
| JP | 57113953 A * | | 7/1982 |
| JP | 60-37432 U | | 3/1985 |
| JP | 62-6126 U | | 1/1987 |
| JP | 11-93794 | | 4/1999 |
| JP | 11091373 A * | | 4/1999 |
| JP | 11-198882 | | 7/1999 |
| JP | 2000-204939 | | 7/2000 |
| JP | 2002211466 A * | | 7/2002 |
| JP | 2003-214274 | | 7/2003 |
| JP | 2003293887 A * | | 10/2003 |
| JP | 2003-341582 A | | 12/2003 |

* cited by examiner

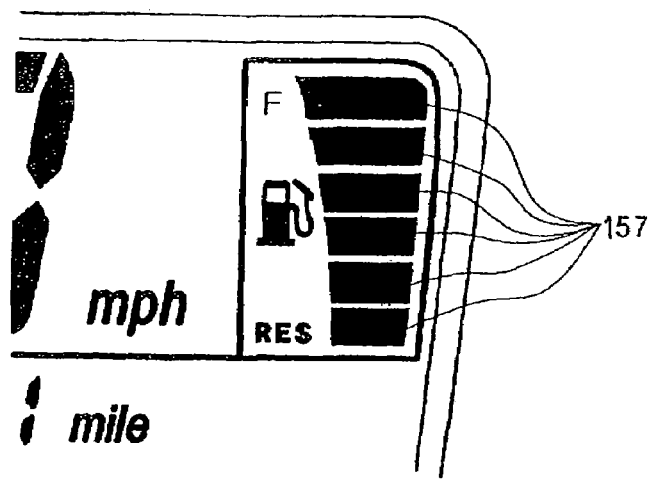
FIG. 22A
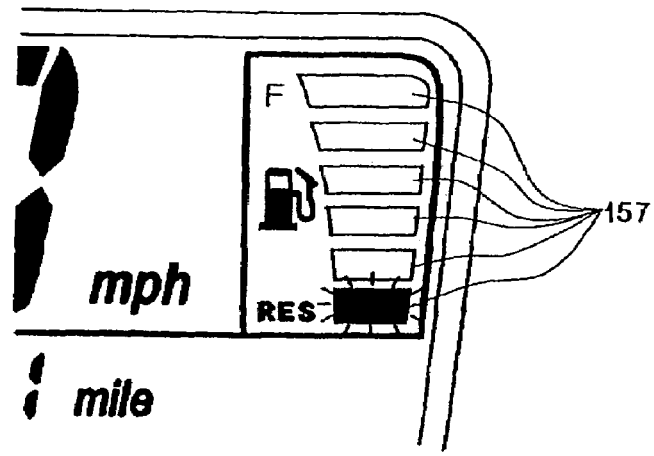
FIG. 22B
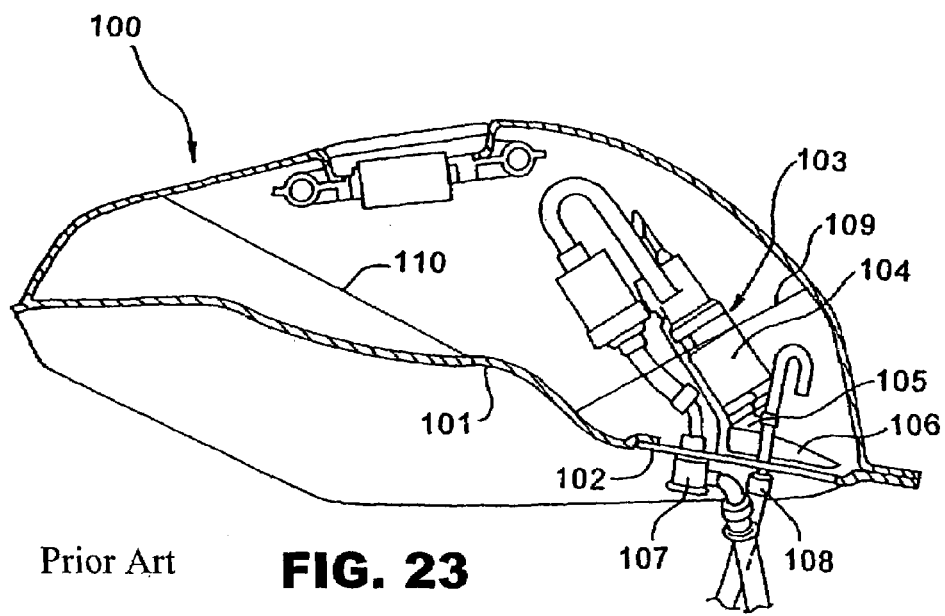
Prior Art   FIG. 23

FUEL INJECTION SYSTEM FOR A SADDLE RIDE TYPE FOUR-WHEEL VEHICLE

FIELD OF THE INVENTION

The present invention relates to a saddle ride type four-wheel vehicle comprising an electronic control type fuel injection system.

BACKGROUND OF THE INVENTION

Conventionally, in saddle ride type four-wheel vehicles (e.g., All terrain Vehicle or "ATV"), the vehicle body and the fuel tank and the like are appropriately covered with a resin-made vehicle body cover. For enhancing the workability at the time of maintenance, some of such vehicles are so configured that the fuel tank and the like can be easily detached without removing the vehicle body cover. Such is disclosed, for instance in Japanese Patent Laid-open No. Hei 11-198882.

In the case of a saddle ride type four-wheel vehicle adopting an electronic control type fuel injection system in a fuel supply system, if the piping between the fuel tank and the fuel pump or the like is simplified, the detachment and mounting of these components are facilitated. Particularly, in the fuel pump for supplying the fuel to a throttle body, the layout must be synthetically investigated, taking into account the influences of external forces due to, for example, contact with an obstacle, cooling performance, and the like. In addition, in the fuel tank and the fuel pump, a structure and a layout such that the gathering or capturing (e.g., entrainment) of air into fuel supply system component parts due to variations of the fuel level can be restrained are desirable, in sufficient consideration of behaviors of the vehicle body at the time of traveling on off-road terrain or the like.

In addition, the present invention aims at providing a saddle ride type four-wheel vehicle which enables efficient layout of fuel supply system component parts including a fuel pump and which restrains entrainment of air into the fuel supply system component parts.

A fuel supply system in which a fuel pump is provided in a fuel tank mounted on a vehicle has also been known. Such is disclosed, for instance, in Japanese Patent Laid-open No. Hei 11-93794.

FIG. 23 is a sectional view of the fuel supply system according to the related art. In FIG. 23, a fuel tank 100 has a flat portion 102 in the vicinity of the rear end (the right side in the figure) of a bottom plate 101, and a fuel pump assembly 103 is mounted to the flat portion 102. A fuel pump 104 and a filter 106 connected to a suction port 105 of the fuel pump 104 are disposed on the side of the upper surface of the flat portion 102, i.e., on the side of the inside surface of the fuel tank 100. A discharge-side hose joint 107 connected to a fuel injection valve (not shown) and a return-side hose joint 108 are provided on the lower surface of the flat portion 102, i.e., on the outside surface of the fuel tank 100.

A fuel supply system having a fuel pump mounted to a bottom plate of a rear portion of a fuel tank in which a front step surface wall for stopping waves is provided for inhibiting a small amount of the residual fuel from moving toward the fuel tank front side at the time of deceleration, at the time of running on a descending slope or at other similar times has also been known. Such is disclosed, for instance, in Japanese Patent Laid-open No. 2003-214274.

Accordingly, the positional relationship between the upper surface of the fuel contained in the fuel tank, i.e., the fuel level, and the fuel pump 104 varies depending on the inclination of the vehicle. In FIG. 23, the fuel level at the time when the vehicle is inclined rearward is indicated by line 109, and the fuel level at the time when the vehicle is inclined forwards is indicated by line 110. As understood from this example, the fuel pump 104 is exposed from the fuel level when the vehicle is inclined forwards. Namely, when the vehicle is inclined forwards, the filter 106 is located on the upper side relative to line 110 indicating the fuel level.

In addition, in the system described in Japanese Patent Laid-open No. 2003-214274, the front step surface wall is provided for stopping waves, which is advantageous concerning the inclination of the vehicle, but the structure inside the fuel tank is thereby complicated. Thus, in conventional fuel supply systems, the fuel pick up condition differs depending on the inclination of the vehicle. Particularly, in an ATV frequently run in an inclined condition on off-road terrain, a system capable of stably supplying the fuel until the residual fuel amount is as small as possible is desired.

Therefore, it is an object of the present invention to provide a fuel supply system for a vehicle which is little influenced by the inclination direction of the vehicle and by which the fuel can be stably supplied to the engine.

Among motorcycles, a saddle ride type vehicle wherein a fuel tank and a saddle ride type seat are disposed at a front position and a rear position on the upper side of an engine and in which a secondary air supply system for clarification of an exhaust gas is provided, has also been known. Such is disclosed, for example, in Japanese Patent Laid-open No. 2000-204939, wherein the secondary air supply system is mounted to a down frame disposed on the front side of the engine inclined forwards and is connected to an exhaust port of the engine through a short piping.

In the present invention, it is desired to reduce the loss due to ventilation resistance by shortening the piping for the secondary air supply system. In order to enhance the secondary air supply efficiency, it is important to lay out the secondary air supply system so as to minimize the influence thereon of the heat from the engine.

Particularly, in a type of covering the periphery of the engine with a vehicle body cover such as an ATV, it is difficult to achieve such a layout in which cooling by running airflow can be expected as in, for example, a motorcycle.

From the viewpoint of enhancing the appearance of the vehicle body, it is desired to lay out the secondary air supply system in such a place as to minimize the possibility of the system being visually exposed to the exterior. Accordingly, it is an object of the present invention to meet these demands.

SUMMARY OF THE INVENTION

According to the present invention, in order to attain the above objects, an embodiment of the present invention provides an ATV which includes an electronic control type fuel injection system in a fuel supply system for an engine mounted thereon, wherein a fuel pump is disposed on the rear side relative to the rotational center axis of front wheels and on the front side relative to said engine.

According to this embodiment, the fuel pump is disposed in a space surrounded by members of a vehicle body frame front portion for suspending the front wheels, so that external forces would not act directly on the fuel pump even if an obstacle makes contact with the vehicle body frame in the case of running on a wild ground or in other similar cases. In addition, the fuel tank, which is usually located on the vehicle body front side, and the fuel pump are disposed close to each other, whereby it is ensured that the piping therebetween is short and, as a result, the piping layout is simplified.

According to this embodiment, external forces would not act directly on the fuel pump even if an obstacle makes contact with the vehicle body frame in the case of running on a wild ground or in other similar cases, so that it is unnecessary to specially provide a protector or the like for protecting the fuel pump, and it is possible to achieve reductions in vehicle body weight and cost. In addition, since the piping between the fuel tank and the fuel pump is made shorter with the result of simplification of the piping layout, the work for mounting and detaching the fuel tank and the fuel pump can be carried out easily, it is possible to reduce component part cost. It is also possible to reduce pumping loss of the fuel pump.

Another embodiment of the present invention provides an ATV which includes an electronic control type fuel injection system in a fuel supply system for an engine mounted thereon, wherein a fuel pump is disposed on the front side relative to the engine, and a throttle body is disposed on the rear side of a cylinder head of the engine.

According to this embodiment, the fuel pump and the throttle body are distributedly disposed respectively on the front and rear sides of the engine, whereby it is made possible to effectively utilize the spaces for laying out component parts in the vehicle body. Also, since the fuel pump is favorably cooled by running airflow, it is difficult for the generation of fuel vapor in the fuel pump (the so-called percolation) to occur. Also, the layout of the throttle body on the rear side of the cylinder head prevents the throttle body from being supercooled by running airflow at the time of a low ambient temperature.

According to this embodiment, it is possible to effectively utilize the spaces for laying out component parts in the vehicle body and, hence, to reduce the vehicle body size. In addition, since it is difficult for percolation in the fuel pump to occur, the fuel injection to the engine is made more accurate, and it is possible to enhance the commercial value of the vehicle itself. On the other hand, since the throttle body can be prevented from being supercooled by running airflow at the time of a low ambient temperature, it is unnecessary to apply an anti-icing measure to the throttle body, and it is possible to achieve reductions in vehicle body weight and cost.

According to another embodiment, a cooling fan for blowing air to the engine is provided, and the fuel pump is disposed between the cooling fan and the engine.

According to this embodiment, the fuel pump is positively cooled by the cooling fan, even in the saddle ride type four-wheel vehicle which is frequently run under low-speed high-load conditions. Therefore, it is possible to favorably restrain percolation in the fuel pump, to perform an accurate fuel injection, and to enhance the commercial value of the vehicle itself.

According to another embodiment, a bottom plate of a fuel tank is roughly V-shaped in vehicle body side view. In another embodiment, the bottom plate of the fuel tank is roughly V-shaped in vehicle body front view.

According to this embodiment, the arrangement in which the bottom plate of the fuel tank is roughly V-shaped in vehicle body side view or in vehicle body front view makes it easier to take out the fuel, as compared with the case where the bottom plate of the fuel tank is provided substantially in parallel to the vehicle body horizontal plane and the bottom plate is provided with a fuel take-out port.

Because of this, it is made easy to take out the fuel and, therefore, entrainment of air into the fuel system component parts can be restrained.

Another embodiment is characterized in that the fuel pump is located in a range on the lower side relative to extension lines of two fuel levels having a front-rear inclination of about 30° including a fuel take-out port of the fuel tank in vehicle body side view. Another embodiment is characterized in that the fuel pump is located in a range on the lower side relative to extension lines of two fuel levels having a left-right inclination of about 15° including the fuel take-out port of the fuel tank in vehicle body front view.

Accordingly, in the case where the vehicle body is inclined, it is difficult for the fuel take-out port to be exposed to air, and it is difficult for the fuel pump to be located on the upper side relative to the fuel level, whereby supply of the fuel to the fuel pump is stabilized. Therefore, the supply of fuel to the fuel pump in the case where the vehicle body is inclined is stabilized and, therefore, entrainment of air into the fuel supply system component parts can be restrained in the same manner as above.

According to another embodiment, a fuel supply system for a vehicle is provided wherein a fuel pump is disposed in a fuel tank. A bottom plate of the fuel tank has a fuel sump portion having a step portion and a lower portion located on the lower side of the step portion. A fuel suction port of the fuel pump is disposed on the lower side relative to the step portion and at an upper surface of the lower portion so as to be located at a roughly central portion in the width direction and the front-rear direction of the fuel tank.

According to this embodiment, the residual fuel in the fuel tank collects in the fuel sump portion. Since the fuel suction port of the fuel pump is located at a roughly central portion in the width direction and the front-rear direction of the fuel tank in relation to the fuel sump portion, even if the vehicle runs in the condition of being inclined forwards, rearward, leftwards, or rightwards, the fuel suction port is located on the lower side relative to the fuel level of the residual fuel under the extent of inclination at the time of normal running, so that the fuel can be picked up and discharged by the fuel pump.

According to another embodiment, the suction port of the fuel pump is located in at least one of a space occupied by a fuel in common at the times when the fuel tank is inclined forwards and rearward at respective expected angles and a space occupied by the fuel in common at the times when the fuel tank is inclined leftwards and rightwards at respective expected angles, in the case where the amount of the residual fuel in the fuel tank is at a predetermined reserve amount.

According to this embodiment, the fuel pump is so disposed that the suction port is located on the lower side of the fuel level common for the inclination directions even if the vehicle is inclined in the condition where the amount of the residual fuel is at a reserve amount, and, therefore, the fuel can be securely picked up until the residual fuel amount is decreased to the reserve amount.

According to another embodiment, the fuel sump portion is a mortar-shaped portion comprised of the lower portion and the step portion surrounding the periphery of the lower portion.

According to this embodiment, even where the residual fuel amount is small, the fuel collecting in the mortar-shaped fuel sump portion would not flow out to the exterior, so that the fuel can be securely picked up and discharged.

According to another embodiment, the fuel sump portion is formed at a roughly central portion in at least one of the width direction and the front-rear direction of the fuel tank.

According to this embodiment, the fuel sump portion is formed at a central portion of the fuel tank, and, therefore, the fuel can be more favorably held in the vicinity of the fuel suction port of the fuel pump when the vehicle is inclined.

According to another embodiment, a layout structure of a secondary air supply system is disclosed for a vehicle having a fuel tank and a saddle ride type seat which are disposed on the upper side of an engine. This embodiment further has a secondary air supply system for clarification of an exhaust gas, the secondary air supply system being disposed in the vicinity of a cylinder of the engine, the secondary air supply system is disposed in an above-cylinder space formed on the upper side of the engine and on the lower side of a front-side portion of a bottom portion of the saddle ride type seat.

According to this embodiment, the secondary air supply system is formed as a body separate from the engine and is disposed in a secondary air supply system layout space on the upper side of the engine. The secondary air supply system layout space is formed by utilizing the lower side of the front-side portion of the bottom portion of the saddle ride type seat inclined forwardly upwards. Therefore, a space for laying out the secondary air supply system can be secured. Moreover, it is difficult for the secondary air supply system to be influenced by the heat of the engine, and the piping for the secondary air supply system can be shortened by laying out the secondary air supply system in the vicinity of the engine. Moreover, it is easy to lay out the secondary air supply system so as to make it difficult for the secondary air supply system to be visually exposed to the exterior.

According to another embodiment, the upper side of the above-cylinder space is covered with a rear-side portion of a bottom portion of the fuel tank and a front-side portion of a bottom portion of the saddle ride type seat located on the rear side of the rear-side portion, and the rear-side portion of the bottom portion of the fuel tank is in the shape of an inclined surface inclined forwardly downwards.

According this embodiment, an upper portion of the secondary air supply system layout space is formed by the rear-side portion of the bottom portion of the fuel tank inclined forwardly downwards and the front-side portion of the bottom portion of the saddle ride type seat inclined forwardly upwards. Therefore, the above-cylinder space serving as the secondary air supply system layout space is roughly mount-shaped in side view, and a comparatively large space can be formed. In addition, it is easy for air to flow upwardly rearward along the bottom portion of the fuel tank located on the secondary air supply system layout space. Therefore, the thermal influence on the secondary air supply system is further reduced.

According to another embodiment, the secondary air supply system is located on the rear side of an engine-cooling fan disposed on the front side of the engine.

According to this embodiment, the secondary air supply system is located on the rear side of the engine-cooling fan provided on the front side of the engine, so that the secondary air supply system can be cooled by utilizing a cooling airflow generated by the engine-cooling fan. Therefore, the thermal influence can be further reduced. Moreover, since the secondary air supply system is not laid out between the engine-cooling fan and the engine, the engine cooling efficiency can be prevented from being lowered.

BRIEF DESCRIPTION OF THE DRAWINGS

A preferred embodiment of the present invention will be described with reference to the accompanying drawings, wherein:

FIG. 22A is a view showing a further embodiment of the residual amount meter;

FIG. 22B is a view showing still a further embodiment of the residual amount meter;

FIG. 23 is a vertical sectional view of a fuel supply system according to the related art;

FIG. 29 is a view showing the layout of an engine, a secondary air supply system, and the like.

DETAILED DESCRIPTION OF THE INVENTION

Embodiments of the invention will be described hereinafter with reference to the accompanying drawings. Descriptions of the front (forward), rear (rearward), left, right and the like directions in the following description are the same as the directions concerning the vehicle. In addition, arrow FR in the figures indicates the vehicle front direction, and arrow LH indicates the vehicle left direction.

Figure 1:
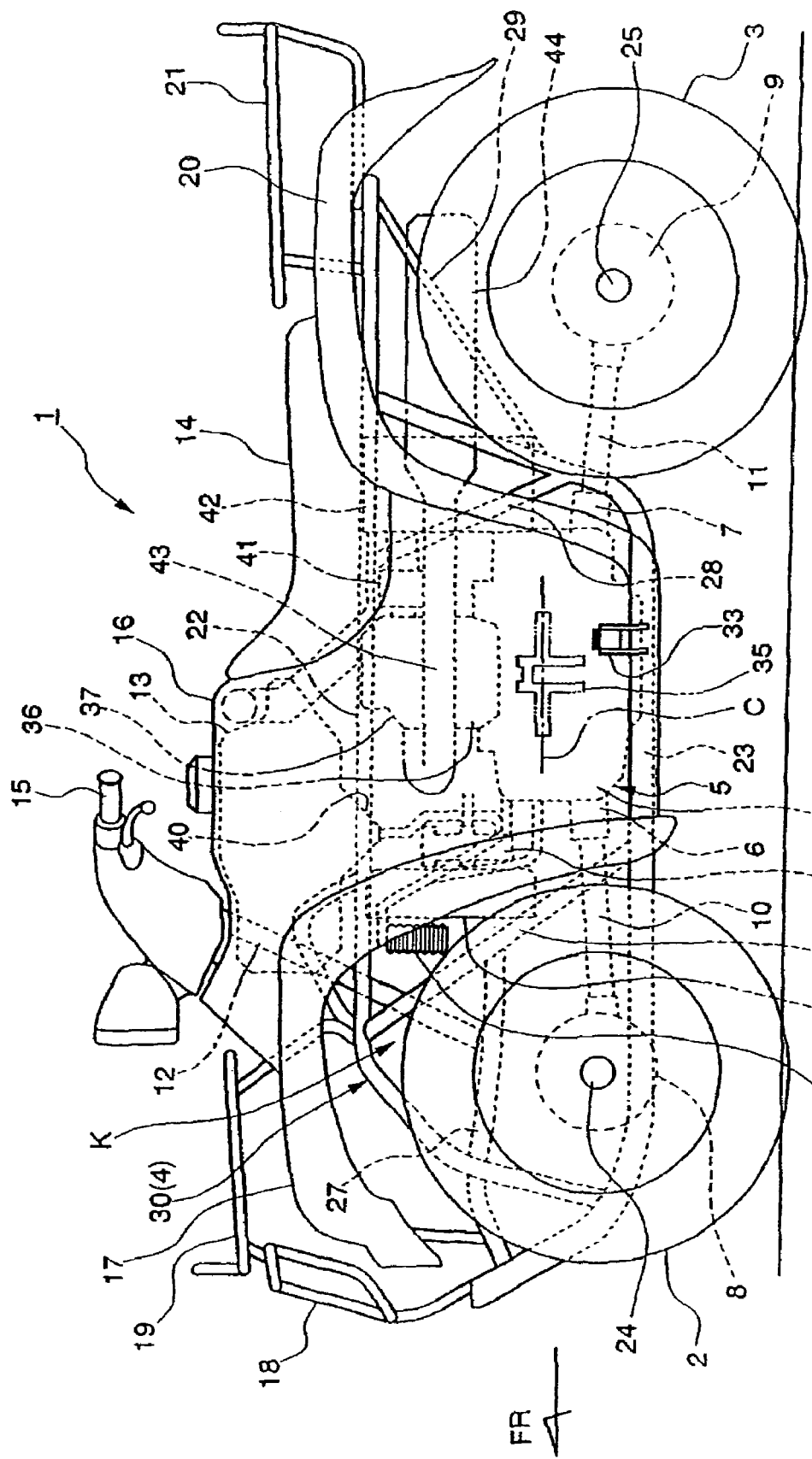
FIG. 1 is a side view of a saddle ride type four-wheel vehicle according to one embodiment of the present invention.

A saddle ride type four-wheel vehicle (vehicle) 1 shown in FIG. 1 is a so-called ATV (All Terrain Vehicle) in which left-right pairs of front wheels 2 and rear wheels 3, being comparatively large-diameter low-pressure balloon tires, are provided on the front and rear sides of a vehicle body configured to be small in size and weight, whereby the minimum height above the ground is secured to be large and the performance of running principally on a wild ground is enhanced. The front wheels 2 and the rear wheels 3 are suspended on a front portion and a rear portion of a vehicle body frame 4 respectively through suspension systems (not shown). An engine 5 is mounted on the vehicle body frame 4 at a roughly central position, and a front-side output shaft 6 and a rear-side output shaft 7 are provided respectively on the front and rear sides of the engine 5. The output shafts 6 and 7 are connected to a front wheel drive mechanism 8 and a rear wheel drive mechanism 9 through a front-side drive shaft 10 and a rear-side drive shaft 11, respectively, and the drive force of the engine 5 are transmitted to the front wheels 2 and the rear wheels 3 through the drive shafts 10, 11 and the drive mechanisms 8, 9.

In addition, at central portions in the vehicle width direction of the saddle ride type four-wheel vehicle 1, there are disposed a steering shaft 12, a fuel tank 13, and a saddle ride seat 14, in this order from the vehicle body front side. A lower end portion of the steering shaft 12 is connected to a steering mechanism (not shown) for steering the front wheels 2, and a steering handle 15 is attached to an upper end portion of the steering shaft 12. A resin-made vehicle body cover 16 for covering a vehicle body front portion inclusive of the fuel tank 13 and a resin-made front fender 17 for covering the front wheels are mounted to front portions of the vehicle body frame 4. A front protector 18 and a front carrier 19 which are composed mainly of steel pipes are mounted on the front side of the steering shaft 12. In addition, a resin-made rear fender 20 for covering the rear wheels 3 is mounted to a rear portion of the vehicle body frame 4, and a rear carrier 21 composed mainly of steel pipes is mounted on the rear side of the saddle ride seat 14.

Figure 2:
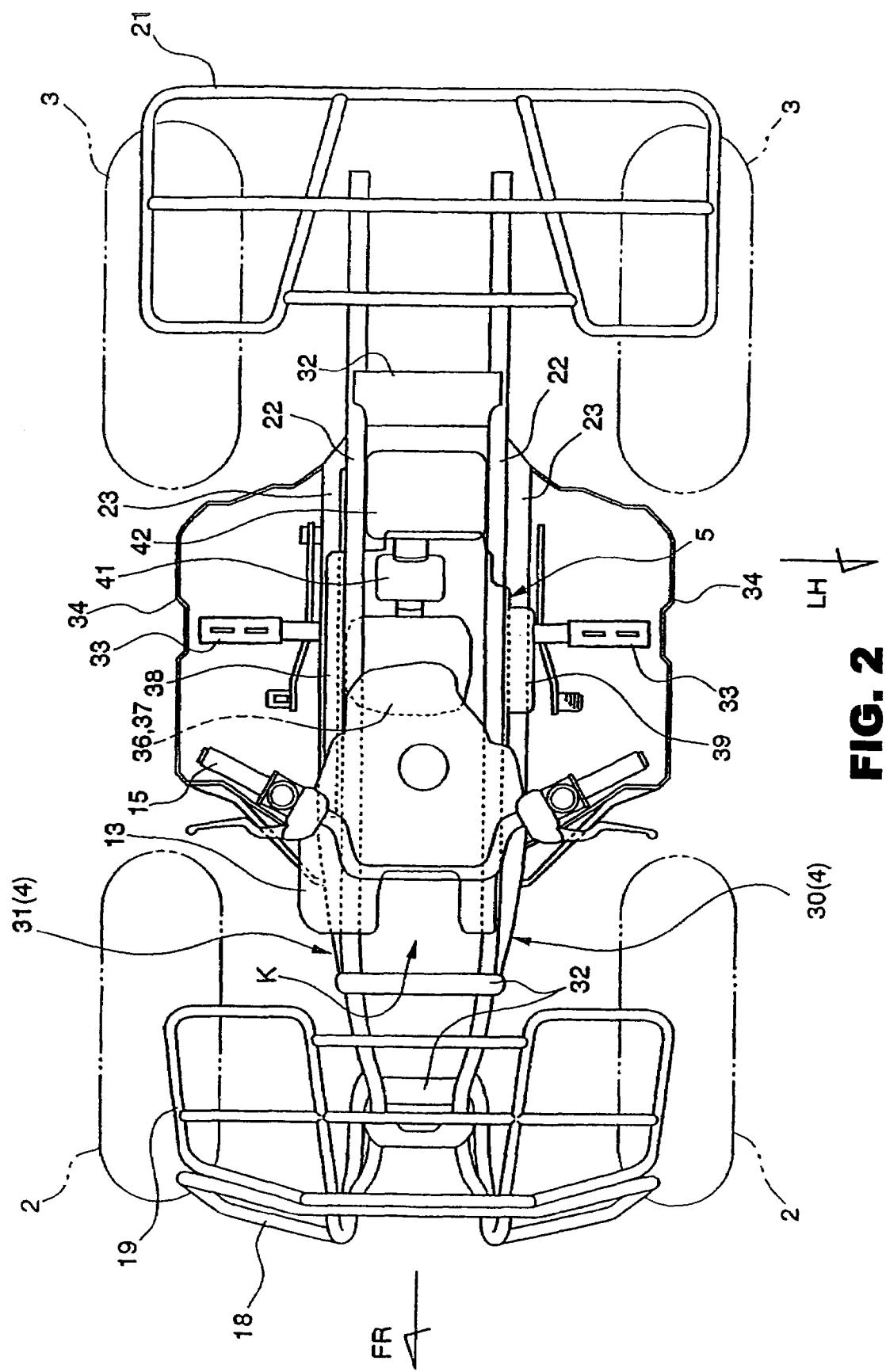
FIG. 2 is a top plan view of a part of the saddle ride type four-wheel vehicle.

Referring to FIG. 2 also, left-right pairs of upper pipes 22 and lower pipes 23 extending roughly along the front-rear direction are disposed at upper and lower portions of the vehicle body frame 4. Front portions of the upper pipes 22 are curved downwards on the front side of the steering shaft 12, and the lower ends thereof are joined to front end portions of the lower pipes 23, respectively. In addition, rear portions of the lower pipes 23 are curved upwards on the rear side of the engine 5, and the upper ends thereof are joined to rear portions of the upper pipes 22. Thus, the upper pipe 22 and the lower pipe 23 form a closed-loop structure in vehicle body side view. The lower pipes 23 are located slightly on the lower side relative to a front axle 24 serving as a rotational center axis of the front wheels 2 and a rear axle 25 serving as a rotational center axis of the rear wheels 3, and the surroundings of the lower pipes 23 constitute the minimum height-above-ground portion of the vehicle body.

Upper end portions of front tension pipes 26 are joined to the curved portions of the upper pipes 22, and lower end portions of the front tension pipes 26 are joined to near-center portions in the front-rear direction of the lower pipes 23. Rear end portions of front sub-pipes 27 are joined to intermediate portions of the front tension pipes 26. The front sub-pipes 27 extend roughly horizontally, and the front ends thereof are joined to the lower pipes 23. The lower ends of rear tension pipes 28 are joined to the curved portions of the lower pipes 23 from the front side thereof, and the upper ends of the rear tension pipes 28 are joined to near-center portions in the front-rear direction of the upper pipes 22. In addition, the lower ends of rear sub-pipes 29 are joined to the curved portions of the lower pipes 23 from the rear side thereof, and the upper ends of the rear sub-pipes 29 are joined to rear end portions of the upper pipes 22.

With the upper pipe 22, the lower pipe 23, the tension pipes and the sub-pipes on the left side as main components, a left-side frame portion 30 constituting a left side portion of the vehicle body frame 4 is formed. Similarly, with the upper pipe 22, the lower pipe 23, the tension pipes and the sub-pipes on the right side as main components, a right-side frame portion 31 constituting a right side portion of the vehicle body frame 4 is formed. Further, the left-side frame portion 30 and the right-side frame portion 31 are integrally coupled to each other through a plurality of cross members 32 set along the vehicle width direction, whereby the vehicle body frame 4 forming a rigid box structure elongate in the front-rear direction is constituted at a central portion in the vehicle width direction. Here, a space portion formed at a central portion of the vehicle width direction in the state of being located between the left-side frame portion 30 and the right-side frame portion 31 and surrounded by the members constituting the vehicle body frame 4 is named K. A front end portion of the vehicle body frame 4 (a front end portion of the space portion K) extends to the front side of the front axle 24. Incidentally, symbol 33 denotes rider's steps, and a step board (not shown) can be attached by the step 33 and a board frame 34 provided in the surroundings thereof.

Figure 3:
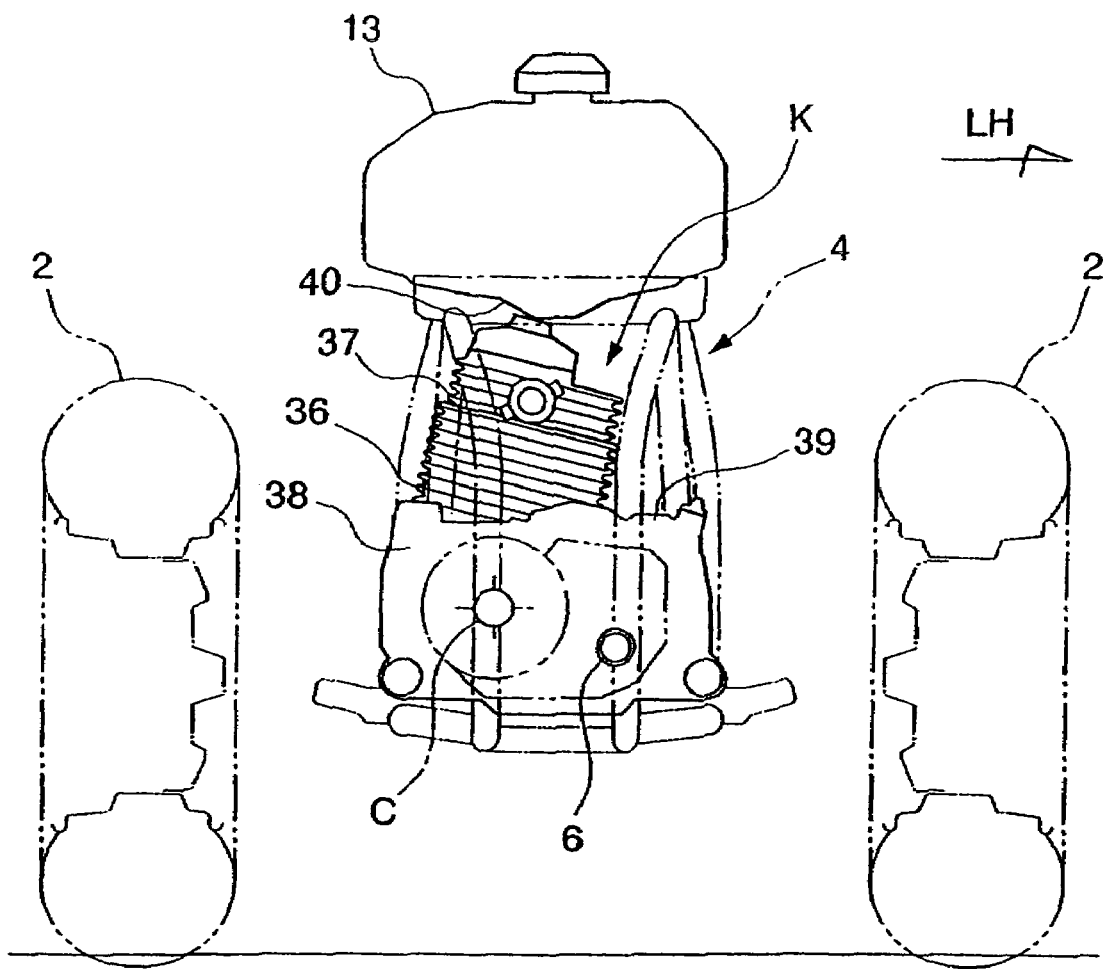
FIG. 3 is a front view of a part of the saddle ride type four-wheel vehicle.

Referring to FIG. 3 also, the engine 5 is, for example, an air-cooled single-cylinder reciprocating engine, and is disposed in the space portion K of the vehicle body frame 4. In addition, the engine 5 is of the so-called transverse layout in which the rotational axis C of a crankshaft 35 thereof is disposed along the front-rear direction at a position slightly deviated to the right side from the center in the vehicle width direction. A cylinder 36 and a cylinder head 37 of the engine 5 are inclined to be located on the further left side in the vehicle width direction as one goes upwards, from a right-side portion in the vehicle width direction of an upper portion of a crankcase 38. A transmission case 39 for containing a transmission (not shown) therein is integrally formed at the left side of the crankcase 38, and, at positions which are on the front and rear sides of the transmission case 39 and are slightly deviated to the left side from the center in the vehicle width direction, output shafts 6 and 7 are provided in the manner of projecting respectively from the front wall and the rear wall of the transmission case 39.

In addition, as shown in FIG. 1, the cylinder 36 and the cylinder head 37 are so disposed as to be located at roughly central portions in the front-rear direction in vehicle body side view. Here, the fuel tank 13 is located at a vehicle body front portion on the upper side relative to the space portion K of the vehicle body frame 4, and the cylinder 36 and the cylinder head 37 are located on the lower rear side of the fuel tank 13. The fuel tank 13 is, for example, a resin-made integrally molded body, and is formed in a desired shape such as to secure a capacity while avoiding the surrounding component parts; for example, a front portion is bifurcated to the left and right sides for permitting the steering shaft 12 to be located therebetween (see FIG. 2).

At a lower portion of the fuel tank 13, a fuel sump portion 40 is formed by bulging downwards a roughly central portion in the front-rear direction of a bottom plate 13a (see FIGS. 8 and 9) of the fuel tank 13. The fuel sump portion 40 has a conical appearance which is roughly V-shaped in vehicle body side view and in front view (as seen from the front side) so that the fuel is reserved on the inside of the mortar-shaped (funnel-shaped) circumferential wall forming the conical surface. In addition, the fuel sump portion 40 is in the shape of a cone which is flat in the vertical direction, in view of its layout with the component parts disposed on the lower side of the fuel tank 13. Specifically, the inclination angle B of the circumferential wall of the fuel sump portion 40 is about 15° against the vehicle body horizontal plane HR, in vehicle body side view and in front view (see FIGS. 8 and 9). The fuel sump portion 40 is located on the rear side relative to the front axle 24 serving as the rotational center axis of the front wheels 2 and on the front side relative to the engine 5.

Here, the engine 5 mounted on the saddle ride type four-wheel vehicle 1 adopts an electronic control type fuel injection system in the fuel supply system thereof, with a throttle body 41 being connected to a rear portion of the cylinder head 37. In other words, the rear side of the cylinder head 37 is the intake side. In addition, an air cleaner 42 is connected to a rear portion of the throttle body 41. The throttle body 41 and the air cleaner 42 are disposed on the rear side of the cylinder head 37 and in the space portion K of the vehicle body frame 4 (see FIG. 2). Besides, an exhaust pipe 43 is connected to a front portion serving as the exhaust side of the cylinder head 37, the exhaust pipe 43 extends rearward while being curved, and is connected to a silencer 44 supported on a rear portion of the vehicle body frame 4.

On the lower side of the fuel tank 13, there are arranged an oil cooler 45 for cooling the engine oil, a cooling fan 46 for forced cooling of the engine 5, and a fuel pump unit 47 which will be described later, in this order from the vehicle body front side. The fuel pump unit 47 is disposed at a position substantially directly under the fuel sump portion 40 of the fuel tank 13 in vehicle body side view. In other words, the fuel pump unit 47 is disposed on the rear side relative to the front axle 24 of the front wheels 2 and on the front side relative to the engine 5. Moreover, the fuel pump unit 47 is disposed at a portion which is between the engine 5 and the cooling fan 46 and near the cooling fan 46.

Figure 8:
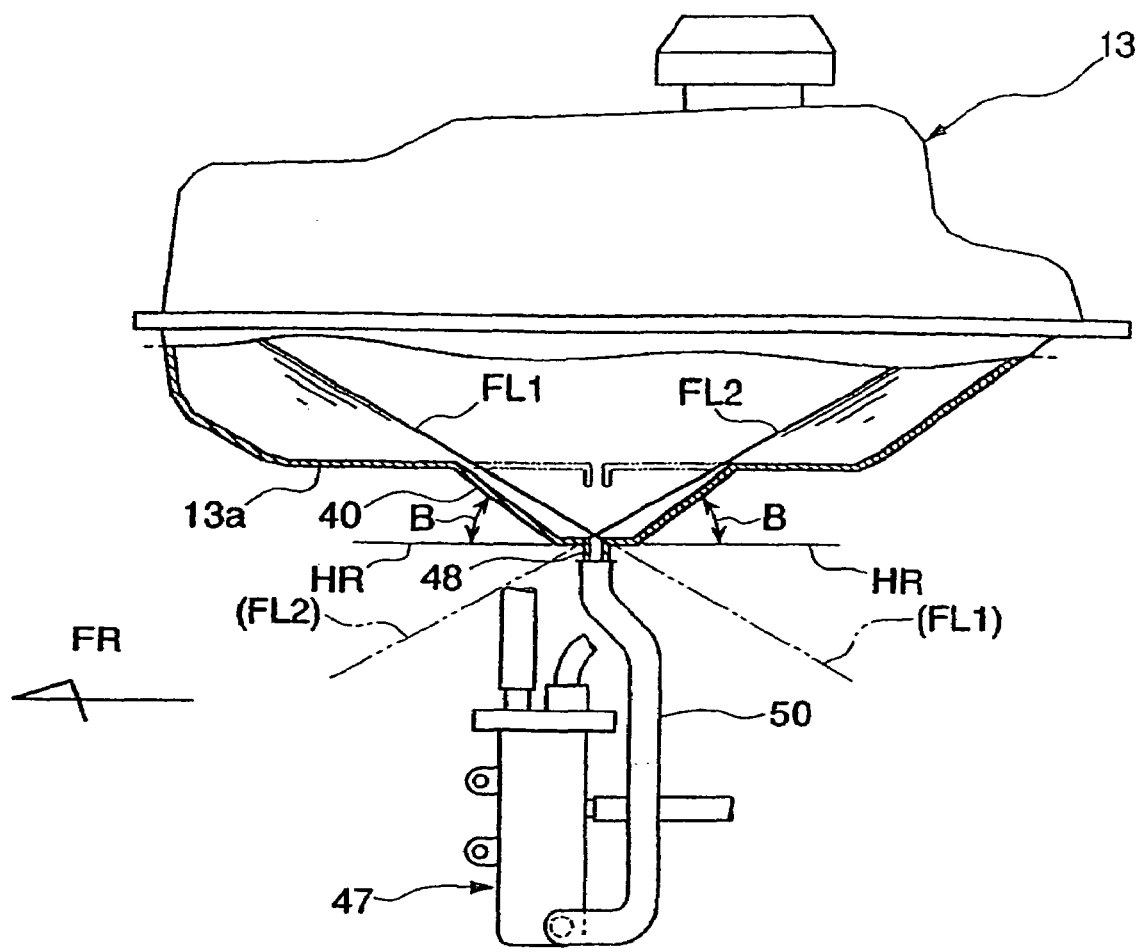
FIG. 8 is a side illustration showing a fuel tank and a fuel pump unit.

Here, as shown in FIG. 8, a first fuel hose 50 serving as a fuel supply pipe for connection between the fuel pump unit 47 and the fuel tank 13 is disposed in a range on the lower side of extension lines (denoted by (FL1) and (FL2) in the figure) of two fuel levels FL1 and FL2 which include a fuel lead-out port (fuel take-out port) 48 of the fuel tank 13 in vehicle body side view and are inclined at a front-rear inclination of about 30° against the vehicle body horizontal plane HR. Incidentally, the fuel level FLI is a plane which passes through the vicinity of a portion directly above the fuel lead-out port 48 of the fuel tank 13 and which is inclined rearwardly downwards at an inclination of about 30° against the vehicle body horizontal plane HR, and the fuel level FL2 is a plane which passes through the vicinity of a portion directly above the fuel lead-out port 48 of the fuel tank 13 and which is inclined forwardly downwards at an inclination of about 30° against the vehicle body horizontal plane HR.

Figure 9:
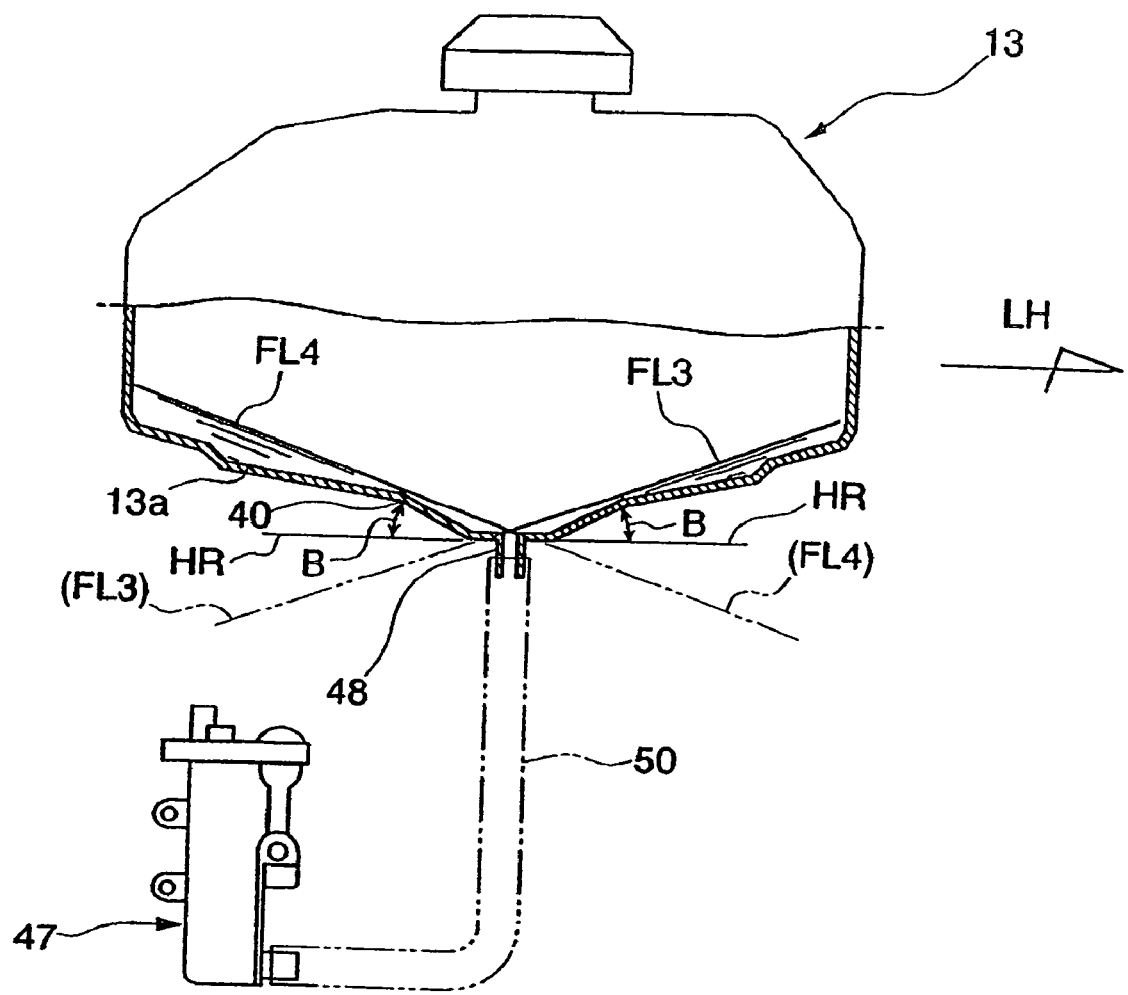
FIG. 9 is a front illustration showing the fuel tank and the fuel pump unit.

Here, as shown in FIG. 9, the fuel pump unit 47 and the first fuel hose 50 are disposed in a range on the lower side relative to extension lines (denoted by (FL3) and (FL4) in the figure) of two fuel levels FL3 and FL4 which include the fuel tank 13 in vehicle body front view and are inclined at a left-right inclination of about 15° against the vehicle body horizontal plane HR.

Incidentally, the fuel level FL3 is a plane which passes through the vicinity of a portion directly above the fuel lead-out port 48 of the fuel tank 13 and is inclined rightwardly downwards at an inclination of about 15° against the vehicle body horizontal plane HR, and the fuel level FL4 is a plane which passes through the vicinity of a portion directly above the fuel lead-out port 48 of the fuel tank 13 and which is inclined leftwardly downwards at an inclination of about 15° against the vehicle body horizontal plane HR.

Incidentally, in vehicle body front view, the fuel pump unit 47 is disposed to be displaced to the right side from a position directly under the fuel sump portion 40 of the fuel tank 13. In addition, the fuel pump unit 47 disposed in this manner is located in the space portion K of the vehicle body frame 4.

Figure 4:
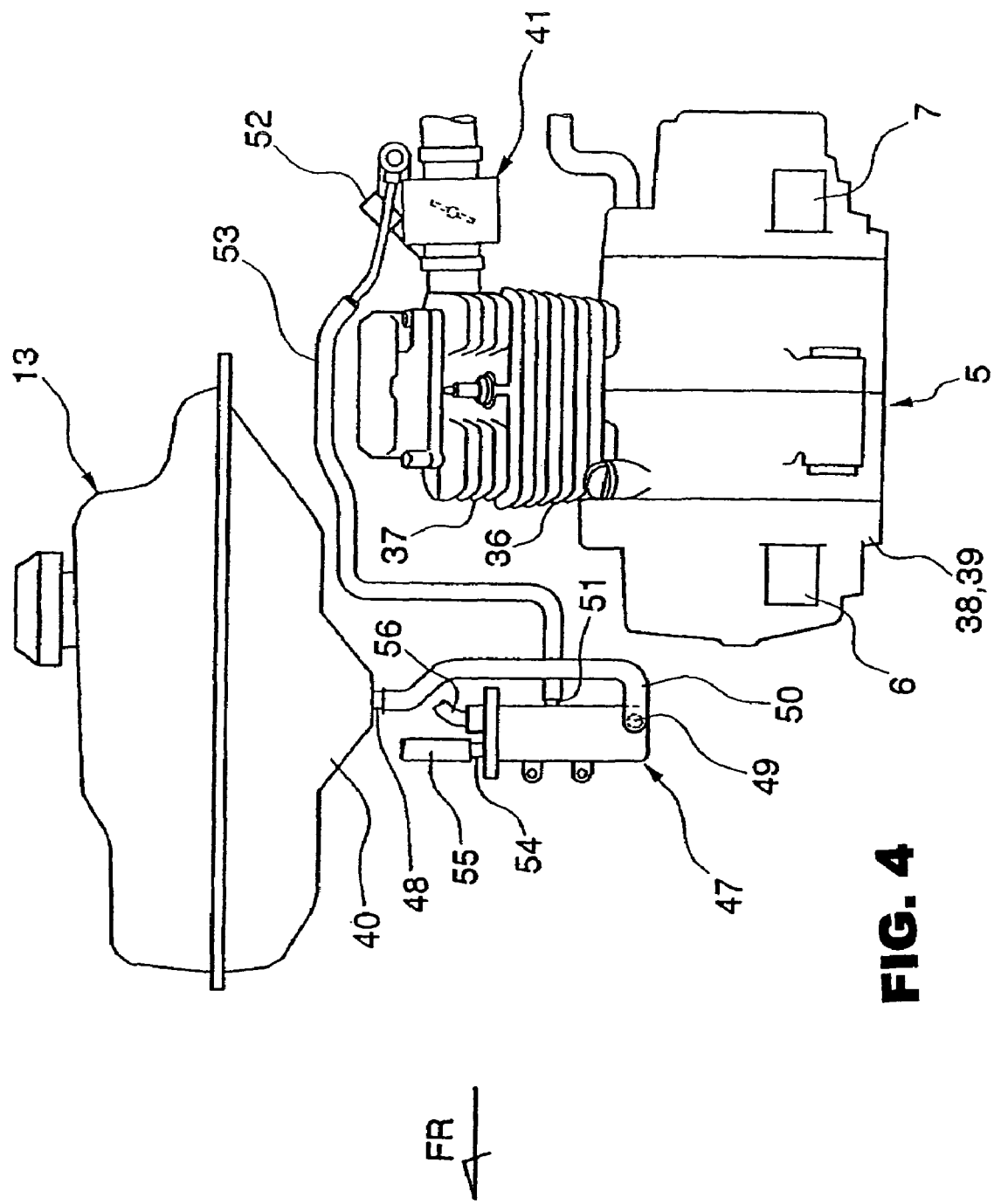
FIG. 4 is an enlarged view of a part of FIG. 1.

As shown in FIG. 4, the fuel lead-out port 48 is provided at a tip end portion of the fuel sump portion 40 of the fuel tank 13 (at a lowermost end portion of the fuel tank 13). The fuel lead-out port 48 and a fuel lead-in port 49 at a lower portion of the fuel pump unit 47 are connected to each other through the first fuel hose 50. In addition, a fuel discharge port 51 is provided at a rear portion of the fuel pump unit 47, and the fuel discharge port 51 and an injector (fuel injection valve) 52 provided at the throttle body 41 are connected to each other through a second fuel hose 53. Further, an air bleed port 54 is provided at an upper portion of the fuel pump unit 47. The air bleed port 54 and a predetermined return port (not shown) of the fuel tank 13 are connected to each other through a third fuel hose 55. Incidentally, symbol 56 denotes an electric power supply harness for supplying electric power to the fuel pump unit 47.

Figure 5:
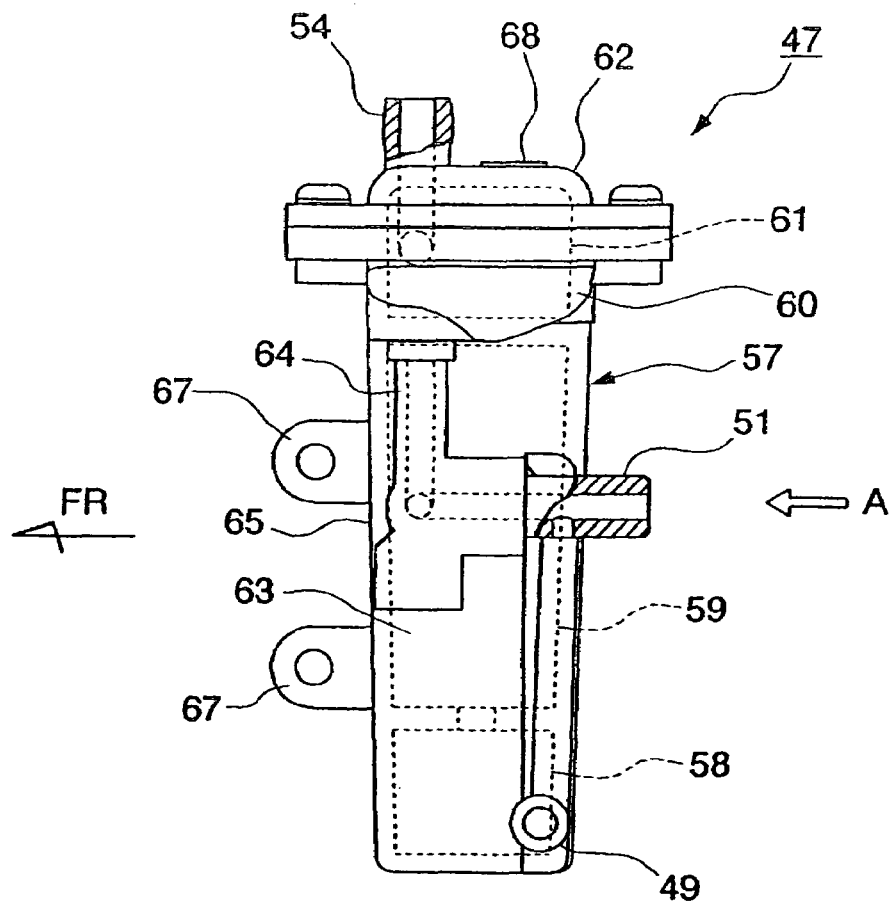
FIG. 5 is a side view of a fuel pump unit.
Figure 6:
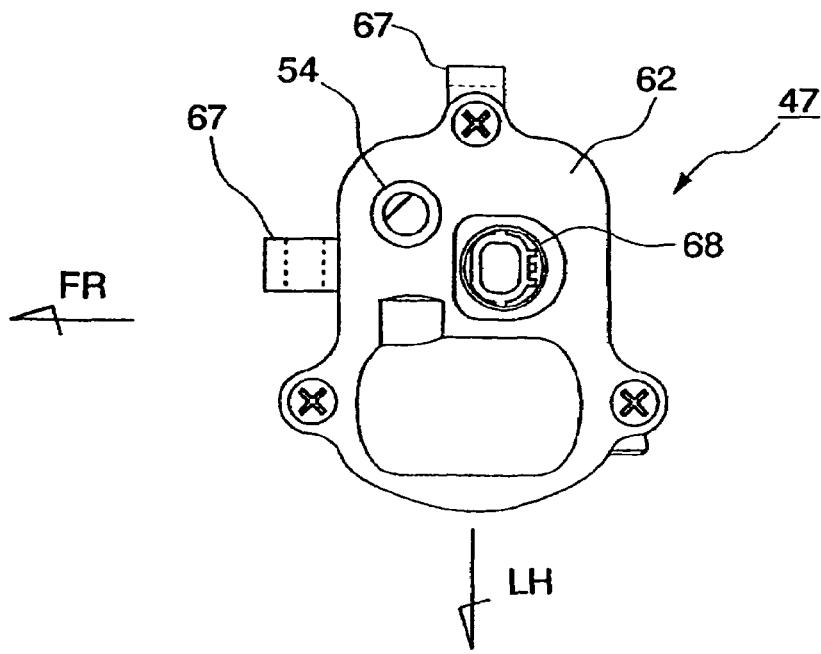
FIG. 6 is a top plan view of the fuel pump unit.
Figure 7:
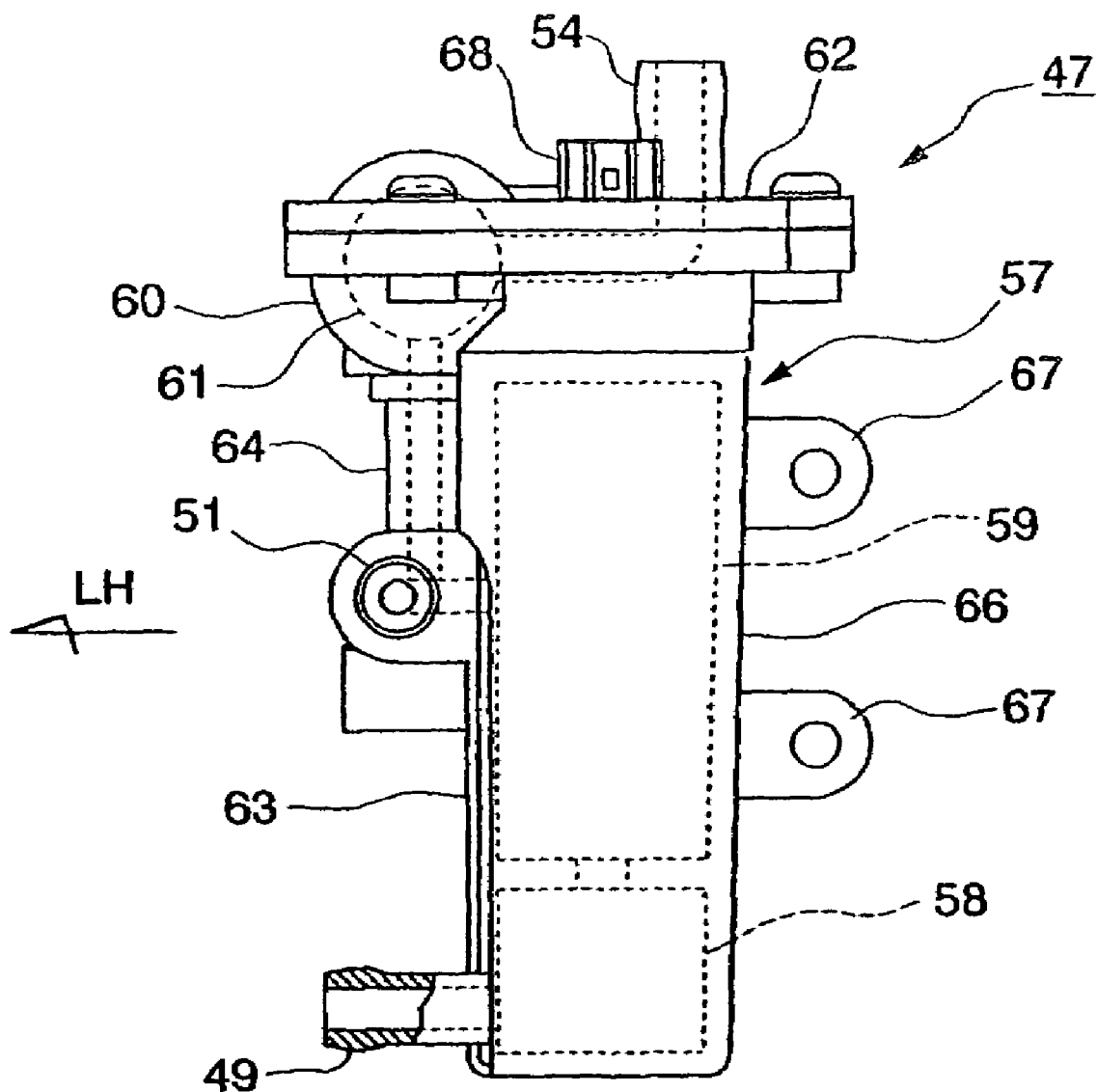
FIG. 7 is a view along arrow A of FIG. 5.

As shown in FIGS. 5 to 7, the fuel pump unit 47 has a structure in which a fuel filter 58 and a fuel pump 59, in this order from the lower side, are contained in a case main body 57 having a vertically elongate roughly parallelepiped shape. A pressure regulator 61 is contained in another chamber 60 provided on the left side of an upper portion of the case main body 57. An upper portion opening of the case main body 57 is closed with a cover 62, whereby the fuel filter 58, the fuel pump 59, and the pressure regulator 61 are integrally configured.

On the outside of a left side wall 63 of the case main body 57, there is provided a communication passage 64 for communication between a roughly central portion in the vertical direction of the fuel pump 59 and the pressure regulator 61. The fuel discharge port 51 projecting to the rear side is provided at a lower end portion of the communication passage 64. In addition, the fuel lead-in port 49 projecting leftwards is provided at a lower end portion of the left side wall 63 of the case main body 57. Further, an upper-lower pair of fixing portions 67 for fixing the fuel pump unit 47 to a shroud of the cooling fan 46, for example, are provided respectively at a front wall 65 and a right side wall 66 of the case main body 57. The cover 62 is provided with a plug 68 for connecting a connector at the tip end of the electric power supply harness, and the air bleed port 54 projecting upwards. The air bleed port 54 and an upper portion of the fuel pump 59 are communicated with each other through an air bleed valve (not shown).

The passage ranging from the fuel pump 59 to the fuel discharge port 51 is connected to the communication passage 64, and the pressure of the fuel discharged from the fuel discharge port 51 can be regulated to a predetermined pressure by the pressure regulator 61. When the fuel pump 59 is operated, the fuel from the fuel tank 13 is introduced to the fuel lead-in port 49 at the lower portion of the case main body 57. The fuel passes through the fuel filter 58, then flows into the fuel pump 59, is raised in pressure to a predetermined fuel pressure, and is then discharged through the fuel discharge port 51 toward the injector 52. In this instance, the pressure of the fuel discharged from the fuel discharge port 51 is regulated to a predetermined pressure by the pressure regulator 61, so that the fuel at the predetermined pressure is always supplied to the injector 52. Besides, the surplus fuel coming from the pressure regulator 61 is returned into another chamber 60, and is then recirculated in the fuel pump unit 47. The vapor of the fuel generated in the fuel pump 59 moves to an upper portion of the fuel pump 59 due to its own buoyancy, and is discharged from the air bleed port 54 after passing through the air bleed valve.

Here, functions relating to the structure of the fuel tank 13 and the layout of the fuel pump unit 47 will be described using FIGS. 8 and 9.

As shown in FIG. 8, in the case where the vehicle body of the saddle ride type four-wheel vehicle 1 is inclined forwards or at the time of deceleration or the like, the fuel level in the fuel tank 13 is inclined rearwardly downwards against the vehicle body horizontal plane HR. In this instance, the bottom plate 13a of the fuel tank 13 is provided substantially in parallel to the vehicle body horizontal plane HR, and the bottom plate 13a is provided with the fuel lead-out port (indicated by two-dotted chain lines in the figure). Even in the case where the fuel lead-out port is exposed to air on the upper side of the fuel level thus inclined, if the bottom plate 13a is provided with the mortar-shaped fuel sump portion 40 and the fuel lead-out port 48 is provided at the tip end thereof as in the fuel tank 13 in this embodiment, it is difficult for the fuel lead-out port 48 from being exposed to air on the upper side of the oil level.

Similarly, in the case where the vehicle body of the saddle ride four-wheel vehicle 1 is inclined rearward or at the time of acceleration or the like, the fuel level in the fuel tank 13 is inclined forwardly downwards against the vehicle body horizontal plane HR, but, again, it is difficult for the fuel lead-out port 48 to be exposed to air.

Here, the front-rear inclination of the fuel level against the vehicle body horizontal plane HR is about 30° at maximum at the time of normal running. Therefore, if the fuel pump unit 47 and the first fuel hose 50 are disposed in a range on the lower side relative to the extension lines of the fuel levels FL1 and FL2 having a front-rear inclination of about 30° including the fuel lead-out port 48, the fuel lead-out port 48 would not be exposed to air at the time of normal running, and, due to the arrangement in which the fuel pump 59 and the fuel supply pipe (the first fuel hose 50) for supplying the fuel thereto are not located on the upper side of the fuel level, the supply of the fuel to the fuel pump 59 is stabilized.

In addition, as shown in FIG. 9, when the vehicle body of the saddle ride type four-wheel vehicle 1 is inclined rightwardly downwards or leftwardly downwards or at the time of steering to the left or right or in other similar occasions, the fuel level in the fuel tank 13 is inclined leftwardly downwards or rightwardly downwards against the vehicle body horizontal plane HR. In this case, also, if the fuel sump portion 40 is mortar-shaped and the fuel lead-out port 48 is provided at the tip end portion thereof, it is again difficult for the fuel lead-out port 48 to be exposed to air.

Here, the left-right inclination of the fuel level against the vehicle body horizontal plane HR is about 15° at maximum at the time of normal running. Therefore, if the fuel pump unit 47 and the first fuel hose 50 are laid out in a range on the lower side relative to the extension lines of the fuel levels FL3 and FL4 having a left-right inclination of about 15° including the fuel lead-out port 48, the supply of the fuel to the fuel pump 59 at the time of normal running is stabilized, in the same manner as above.

According to the embodiment above, in the saddle ride type four-wheel vehicle 1 adopting the electronic control type fuel injection system in the fuel supply system of the engine 5 to be mounted, the fuel pump unit 47 comprising the fuel filter 58, the fuel pump 59, and the pressure regulator 61 integrally configured is laid out on the rear side relative to the front axle 24 and on the front side relative to the engine 5.

This layout ensures that the fuel pump unit 47 is disposed in the space portion K surrounded by the members of a front portion of the vehicle body frame 4 for suspending the front wheels 2. Therefore, even if an obstacle makes contact with the vehicle body frame 4 as in the case of running on a wild ground, external forces would not act directly on the fuel pump unit 47. Accordingly, it is unnecessary for separately providing a protector or the like for protecting the fuel pump unit 47, and it is possible to achieve reductions in the vehicle body weight and cost. In addition, since the fuel tank 13 located at a front portion of the vehicle body and the fuel pump unit 47 are disposed close to each other, the piping therebetween is made shorter and, as a result, the piping layout is simplified. Moreover, the piping between component parts is simplified, as compared with the case where the fuel pump, the fuel filter, and the pressure regulator are configured as separate members. Therefore, the work for mounting and detaching the fuel tank 13 and the fuel pump unit 47 is facilitated, a reduction in component parts cost can be achieved, and a reduction in pumping loss of the fuel pump 59 can also be achieved.

Besides, in the saddle ride type four-wheel vehicle 1, the throttle body 41 and the air cleaner 42 are laid out on the rear side of the cylinder head 37 of the engine 5.

This layout ensures that the fuel pump unit 47 and the throttle body 41 are disposed respectively on the front and rear sides of the engine 5, so that it is possible to effectively utilize the spaces for laying out component parts in the vehicle body. Therefore, it is possible to reduce the vehicle body size.

Here, even if a vapor is generated due to percolation in the fuel pump 59, the vapor can be discharged through an air bleed nozzle at an upper portion of the fuel pump 59. However, since the fuel pump unit 47 is favorably cooled by running airflow, it is difficult for the percolation in the fuel pump 59 to occur. Therefore, the injection of the fuel to the engine 5 is performed more accurately, and the commercial value of the vehicle itself can be enhanced. On the other hand, since the throttle body 41 is laid out on the rear side of the cylinder head 37, the throttle body 41 can be prevented from being supercooled by running airflow at a time of a low ambient temperature. Therefore, it is unnecessary to apply an anti-icing measure to the throttle body 41, so that it is possible to achieve reductions in vehicle body weight and cost.

Furthermore, the fuel pump unit 47 is laid out at a position between the engine 5 and the cooling fan 46 and nearer to the cooling fan 46.

This layout ensures that the fuel pump unit 47 is positively cooled by the cooling fan 46, and transfer of heat from the engine 5 is suppressed. Therefore, even in a vehicle frequently run under low-speed high-load conditions as in the case of the saddle ride type four-wheel vehicle 1 particularly, it is possible to favorably restrain the percolation in the fuel pump 59, to perform an accurate fuel injection, and to enhance the commercial value of the vehicle itself.

Furthermore, a part of the bottom plate 13a of the fuel tank 13 is formed as the mortar-shaped fuel sump portion 40 bulged while becoming smaller in section in the downward direction. This ensures particularly that the fuel can be easily taken out even in the case where the residual fuel amount is small. In addition, at the time when the vehicle body is inclined, at the time of acceleration or deceleration, at the time of steering and in other similar occasions, it is difficult for the fuel lead-out port 48 provided at the tip end portion of the fuel sump portion 40 (i.e., at the lowermost end portion of the fuel tank 13) to be exposed to air, so that entrainment of air into fuel supply system component parts can be restrained.

Moreover, the fuel pump unit 47 and the first fuel hose 50 are located in a range on the lower side relative to the extension lines of the two fuel levels FL1 and FL2 having a front-rear inclination of about 30° including the fuel lead-out port 48 of the fuel tank 13 in vehicle body side view, and are located in a range on the lower side relative to the extension lines of the two fuel levels FL3 and FL4 having a left-right inclination of about 15° including the fuel lead-out portion 48 in vehicle body front view. This layout stabilizes the supply of the fuel to the fuel pump 59 when the vehicle body is inclined, so that entrainment of air into fuel supply system component parts can be restrained, in the same manner as above.

Particularly, the above-mentioned effect is extremely effective in a vehicle in which the vehicle body is frequently inclined during running, as in the case of the saddle ride type four-wheel vehicle 1 designed as an ATV.

Incidentally, the present invention is not limited to the above-described embodiment. For example, the present invention is also applicable not only to saddle ride type four-wheel vehicles of the two wheel drive type or of a type capable of switching between four wheel drive and two wheel drive but also to saddle ride type four-wheel vehicles on which an engine of the lateral layout with the rotational axis of the crankshaft being parallel to the vehicle width direction is mounted.

Referring to FIG. 9, also, the fuel sump portion 40 may be a valley-like one which is roughly V-shaped in vehicle body side view shown in the figures, or similarly may be a valley-like one which is roughly V-shaped in vehicle body front view not shown in the figures. Further, the fuel sump portion 40 may be a polygonal pyramid-like one which is roughly V-shaped in vehicle body side view and front view. Here, the inclination angle of each of the planes forming the roughly V-shaped structure, inclusive of the circumferential wall of the fuel sump portion 40 in the above-described embodiment, is not limited to about 15° against the vehicle body horizontal plane in vehicle body side view or front view, and is not limited to the rectilinear plane; for example, each of the planes may be in an arcuate or stepped shape. Moreover, the whole part of the bottom plate 13a of the fuel tank 13 may be roughly V-shaped.

Further, a configuration in which the fuel pump is independent from the fuel filter and the pressure regulator, for example, may be adopted in place of the fuel pump unit 47.

Besides, the configuration of the above-described embodiment is merely one example, and various appropriate modifications are naturally possible without departure from the gist of the present invention.

Figure 12:
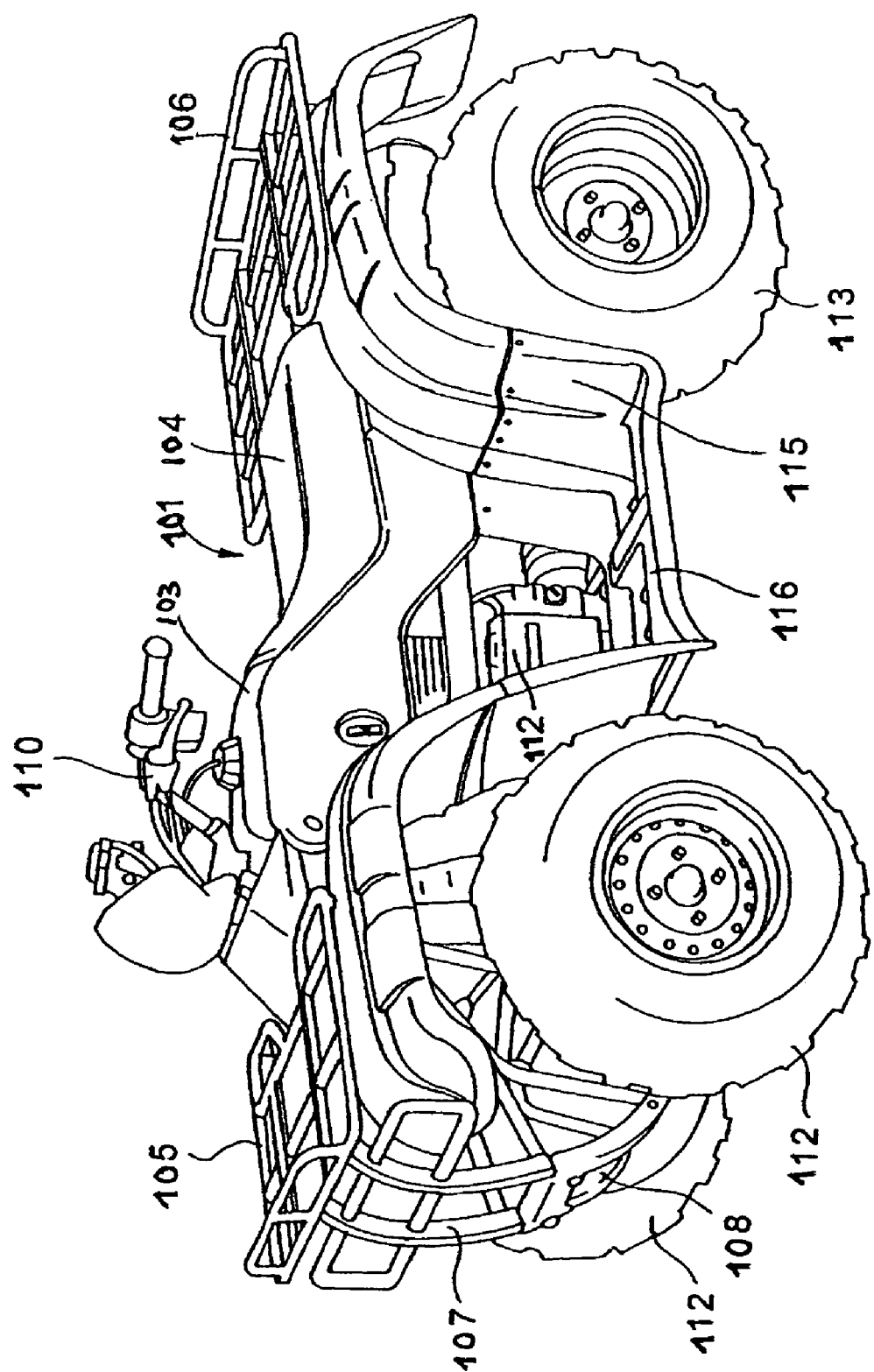
FIG. 12 is a perspective view of an ATV comprising the fuel supply system according to another embodiment of the present invention.
Figure 13:
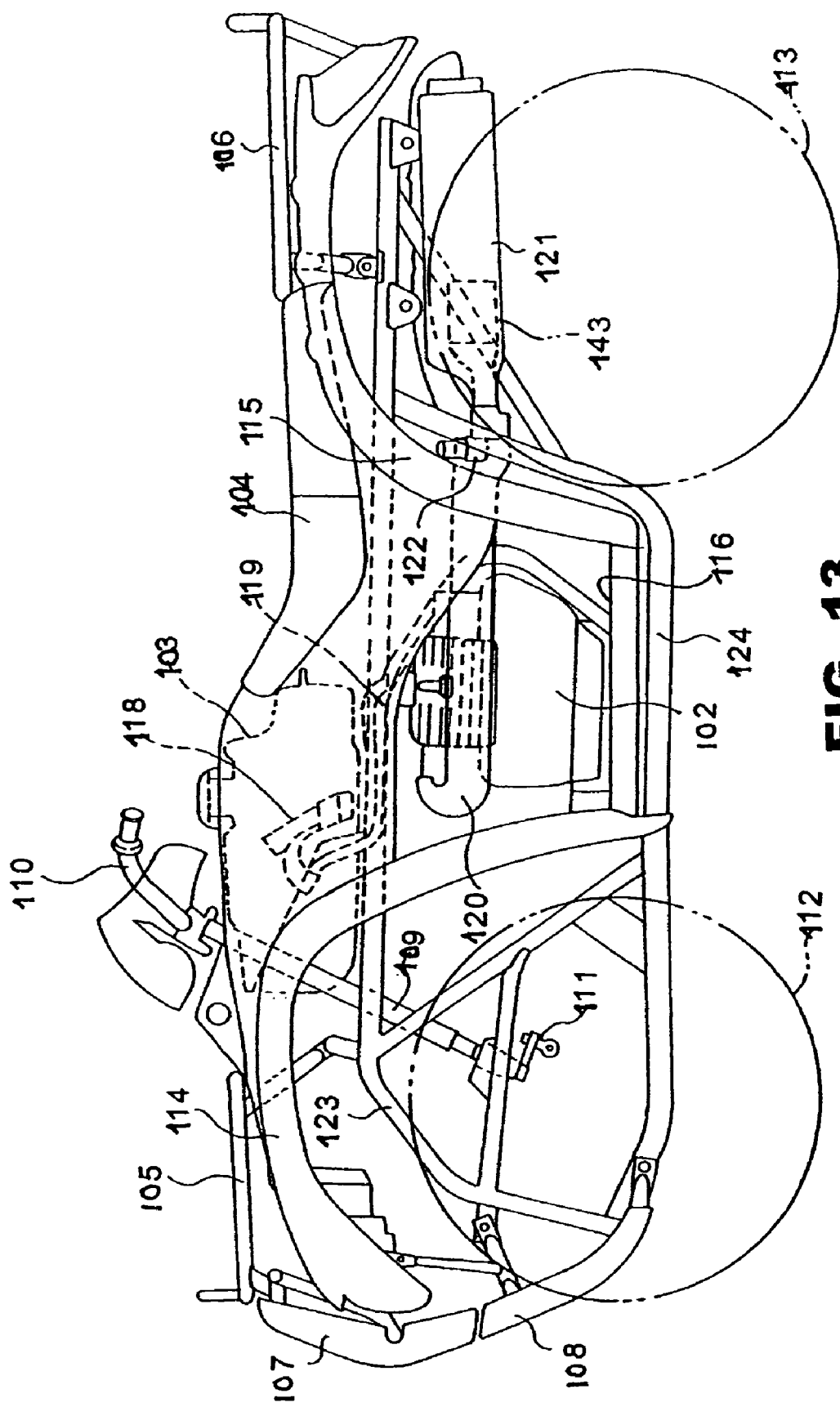
FIG. 13 is a side view of the same.
Figure 14:
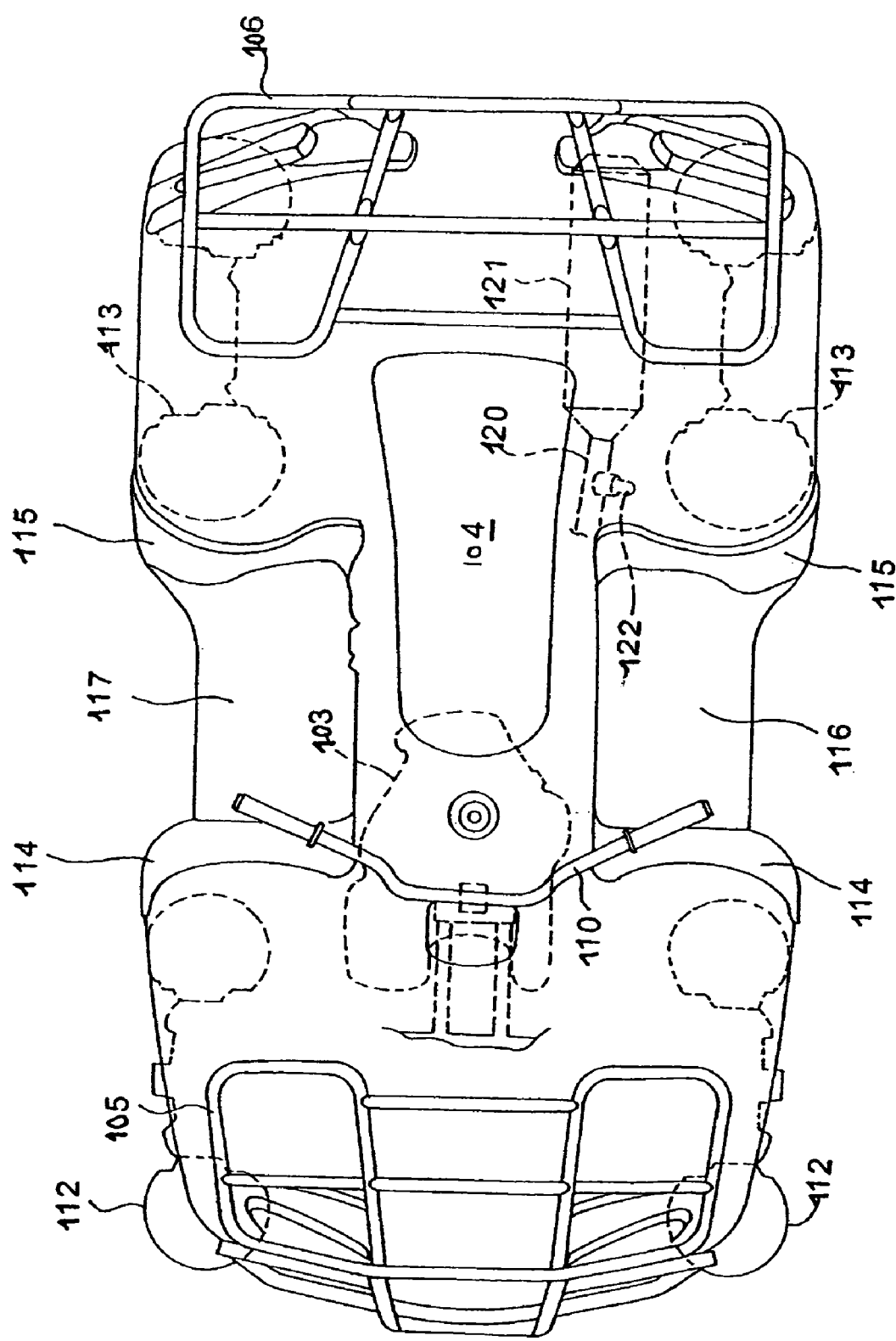
FIG. 14 is a plan view of the same.

FIG. 12 is a perspective view of an ATV on which a fuel supply system according to another embodiment of the present invention is mounted. FIG. 13 is a left side view of the same, and FIG. 14 is a plan view of the same.

In these figures, the ATV 101 comprises an engine 102 located at the center of the vehicle body, a fuel tank 103 located on the upper side of the engine 102, a rider's seat 104, front and rear luggage carriers 105 and 106, and a front guard 107 and an under guard 108 which are provided at the frontmost end of the vehicle. The fuel tank 103 has a structure in which a front portion thereof is recessed toward the vehicle rear side as seen in FIG. 14, and a steering shaft 109 is extended to vertically pass through the recess. In other words, the fuel tank 103 can avoid an interference with the steering shaft 109 by having the recessed portion, and the fuel tank 103 can be extended to the front side of the steering shaft 109.

A steering handle 110 is provided at an upper portion of the steering shaft 109, and a link 111 is provided at a lower portion of the steering shaft 109. The link 111 is connected to front wheels 112 through connection devices (not shown). Rear wheels 113 are provided at a rear portion of the vehicle. A front fender 114 and a rear fender 115 including a tire house are provided respectively on the upper side of the front wheels 112 and the rear wheels 113 so as to cover the front wheels 112 and the rear wheels 113. Footrests 116 and 117 for the rider seated astride the rider's seat 104 to put his feet are provided between the front fender 114 and the rear fender 115.

A fuel pump 118 is contained in the fuel tank 103. The fuel picked up by the fuel pump 118 is supplied through a fuel hose 119 to a fuel injection valve (not shown) provided in an intake pipe of the engine 102. In addition, an exhaust pipe 120 is connected to the engine 102, and the exhaust pipe 120 is connected to a muffler 121 disposed on the vehicle rear side. The exhaust pipe 120 is provided with an $O_2$ sensor 122 in the vicinity of its portion for connection to the muffler 121.

The ATV 101 comprises a main frame 123 and an under frame 124, and the above-mentioned components of the vehicle are supported by these frames 123, 124 and pipes or plates such as sub-frames and brackets which are connected to the frames 123, 124.

Figure 10:
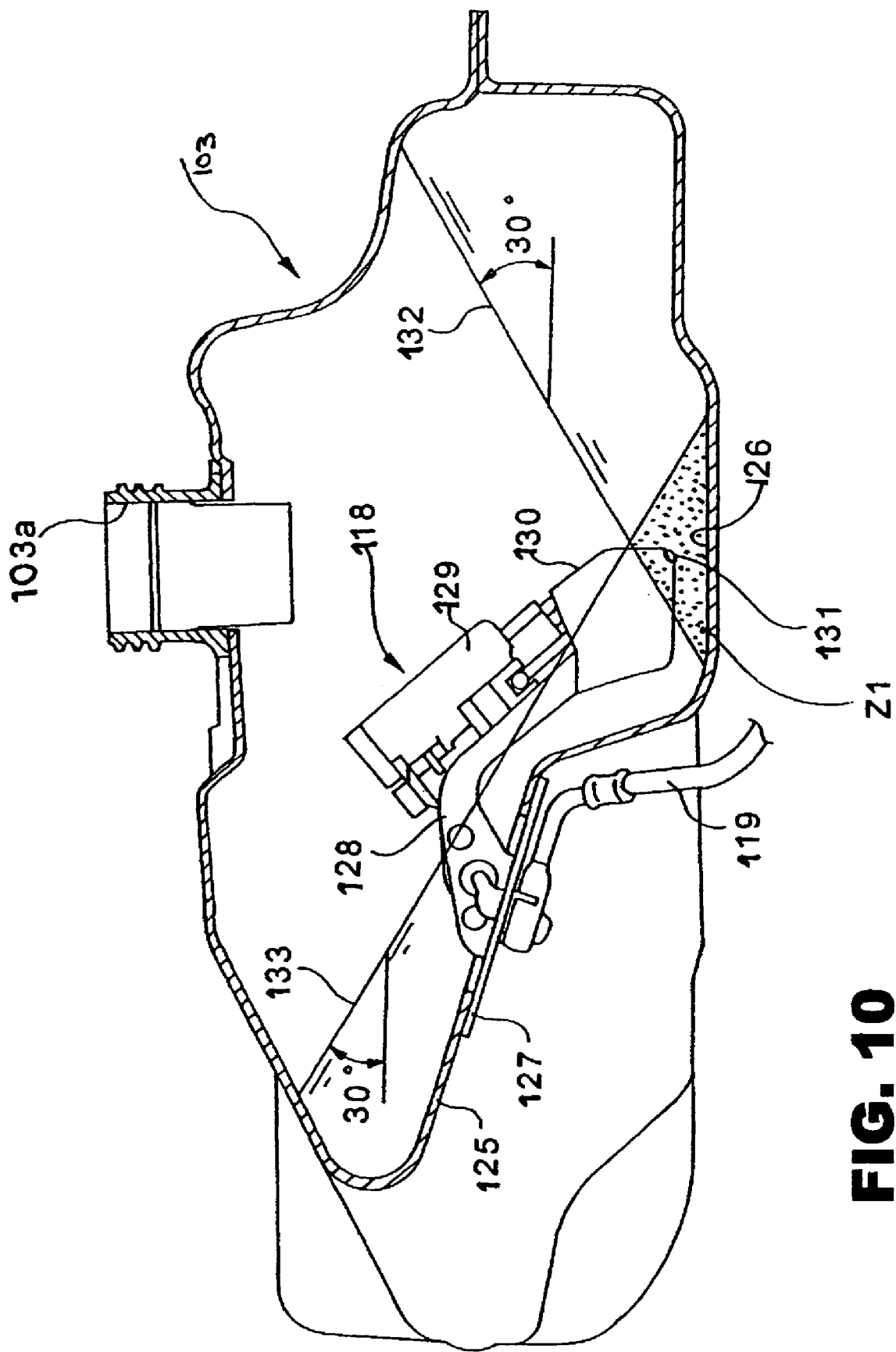
FIG. 10 is a vertical sectional view of a fuel supply system according to another embodiment of the present invention.
Figure 11:
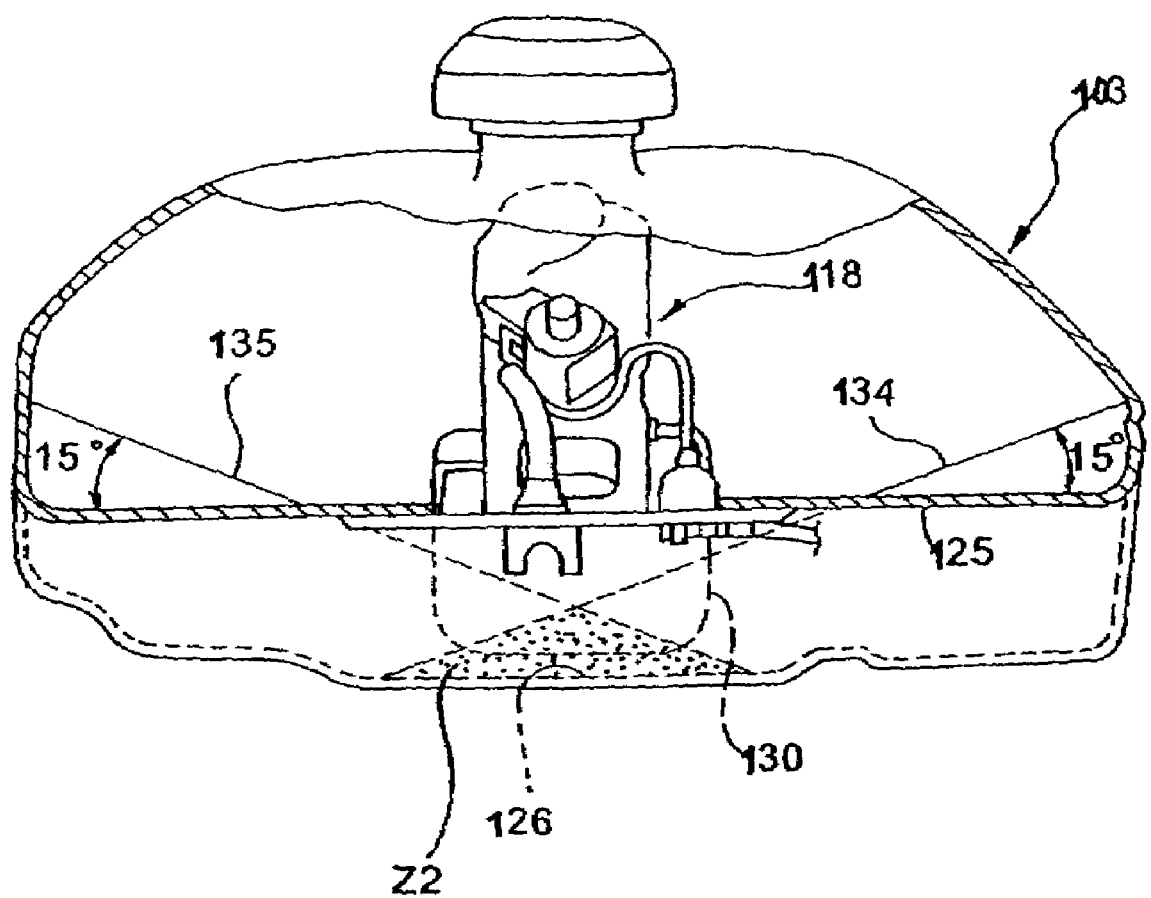
FIG. 11 is a horizontal sectional view of the fuel supply system according to the embodiment of the present invention shown in FIG. 10.

FIG. 10 is a vertical sectional view of the fuel supply system, and FIG. 11 is a horizontal sectional view of the fuel supply system. In the figures, a bottom plate of the fuel tank 103 has a surface (hereinafter referred to as "step portion") 125 located near the vehicle front side and downwardly inclined toward the vehicle rear side (the rightward direction in the figure), and a surface (hereinafter referred to as "lower portion") 126 formed on the vehicle rear side relative to the step portion 125 and one step lower than the step portion 125. A base plate 127 for mounting the fuel pump is attached to the step portion 125 from the exterior of the fuel tank 103. A stay 128 is fixed to an upper portion of the base plate 127, i.e., to the inside of the fuel tank 103. The stay 128 is so curved to be once directed upwards from the base plate 127 and then directed toward the lower portion 126. A fuel pump main body 129 is mounted to the stay 128. The fuel pump main body 129 is so mounted that a fuel suction port 131 formed in a chamber 130 is located at a position lower than the step portion 25 and in proximity to the upper surface of the lower portion 126, at a roughly central portion in the width direction and the front-rear direction of the fuel tank 103. The fuel tank 103 is provided at its upper portion with an oil supply port 103a for supplying the fuel tank 103 with the fuel.

The fuel pump 118 is so disposed that, when the amount of the residual fuel in the fuel tank 103 is at a predetermined reserve amount, both the fuel level 132 in the fuel tank 103 in the case where the vehicle is inclined rearward and the fuel level 133 in the case where the vehicle is inclined forwards are located on the upper side relative to a lower portion (specifically, a suction filter which will be described later) of the chamber 130. In this example, both the angle of rearward inclination and the angle of forward inclination are assumed to be 30°.

Incidentally, the fuel suction port 131 of the fuel pump 118 is located at the roughly central portion in the vehicle front-rear direction and the vehicle width direction of the fuel tank 103, but the lower portion 126 is not necessarily limited to the central portion in the directions; it suffices for the lower portion 126 to be formed in the bottom plate including the central portion, at least. In other words, it suffices that, when the residual fuel amount is reduced, the fuel collects at the lower portion 126 located below the step portion 125, and the fuel suction port 131 located at the roughly central portion in the vehicle front-rear direction and the vehicle width direction is located at the fuel sump portion.

Furthermore, as shown in FIG. 11, the fuel pump 118 is so disposed that, when the residual fuel amount is at the predetermined reserve amount, both the fuel level 134 when the vehicle is inclined rightwards and the fuel level 135 when the vehicle is inclined leftwards are located on the upper side relative to the fuel suction port 131 provided at the lower portion of the chamber 130. In this example, both the angle of rightward inclination and the angle of leftward inclination are assumed to be 15°.

Thus, the fuel pump 118 is so disposed that the fuel suction port 131 is proximate to the upper surface of the lower portion 126 and is located at a central portion in the vehicle width direction of the fuel tank 103. To be more specific, in the case where the residual fuel amount in the fuel tank 103 is at the predetermined reserve amount, and in the case where the angles of road surface inclinations in the front-rear directions and the left-right directions expected in running of the vehicle are defined as expected angles, the fuel suction port 131 of the fuel pump 118 is preferably located in at least one of a space (denoted by symbol Z1 in FIG. 10) occupied by the fuel in common at the times when the fuel tank 103 is inclined forwards and rearward at respective expected angles (30° in this embodiment) and a space (denoted by symbol Z2 in FIG. 11) occupied by the fuel in common at the times when the fuel tank 103 is inclined leftwards and rightwards at respective expected angles (15° in this embodiment).

Incidentally, the reserve amount is the lower limit of the residual fuel amount which is set according to the kind of the vehicle, i.e., the use and type of the vehicle; for example, in the ATV 101 in this embodiment, about 20% based on the amount of the fuel filling up the fuel tank 3 is set as the reserve amount. In general, the reserve amount is set as a reference amount for informing the rider of the condition where the residual fuel amount is small by, for example, outputting a detection signal from a sensor to turn ON or blink an alarm lamp or using a meter when the residual fuel amount is reduced. The reserve amount is not limited to 20%, and can be determined on the basis of each individual vehicle. Examples of indication of the reserve amount will be described later, referring to FIG. 19 and the like.

In addition, in a vehicle provided with a reserve tank, the amount of the fuel reserved in the reserve tank is adopted as the reserve amount.

Figure 15:
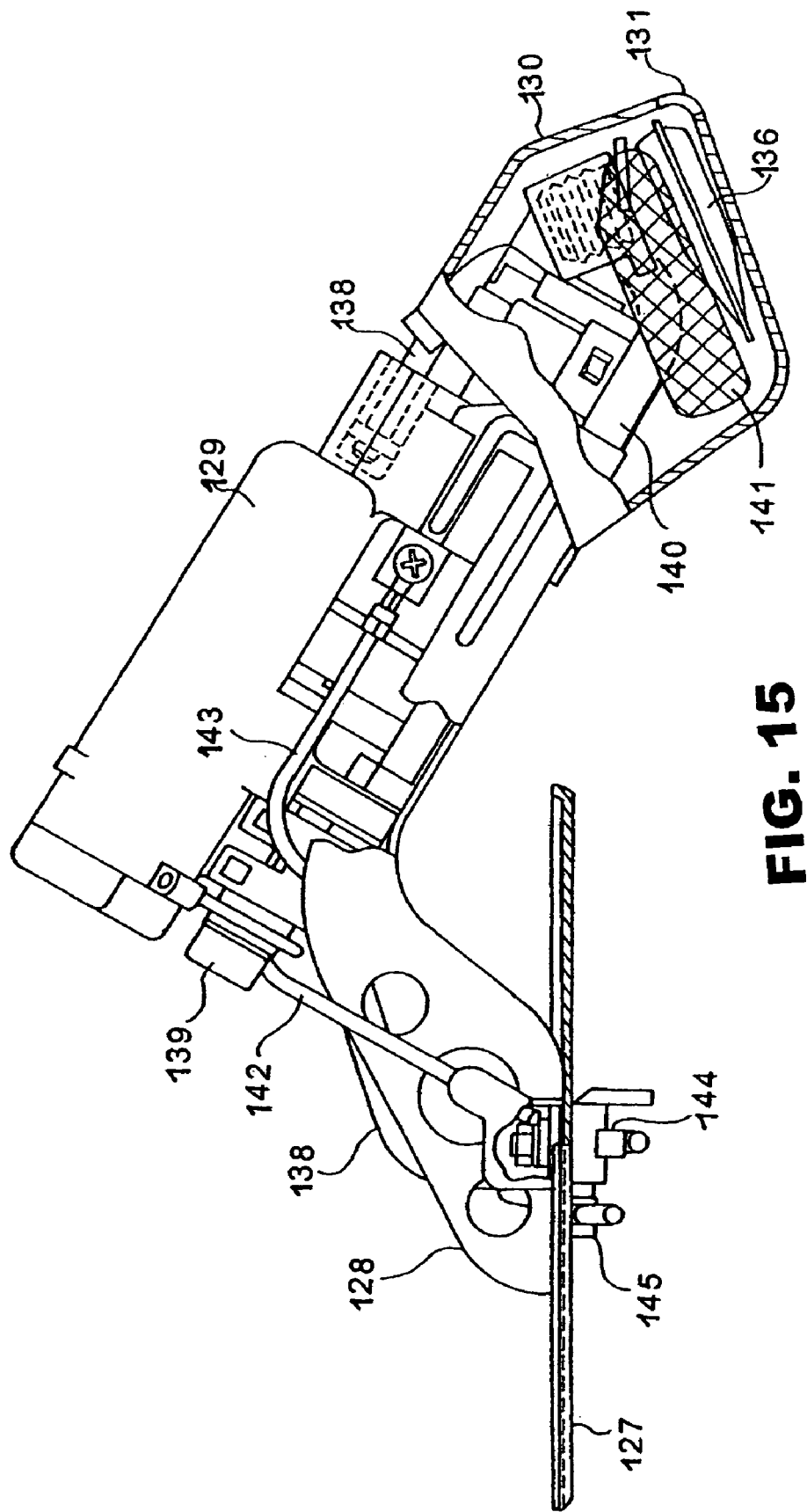
FIG. 15 is an enlarged side view of the fuel pump according to another embodiment of the present invention.
Figure 16:
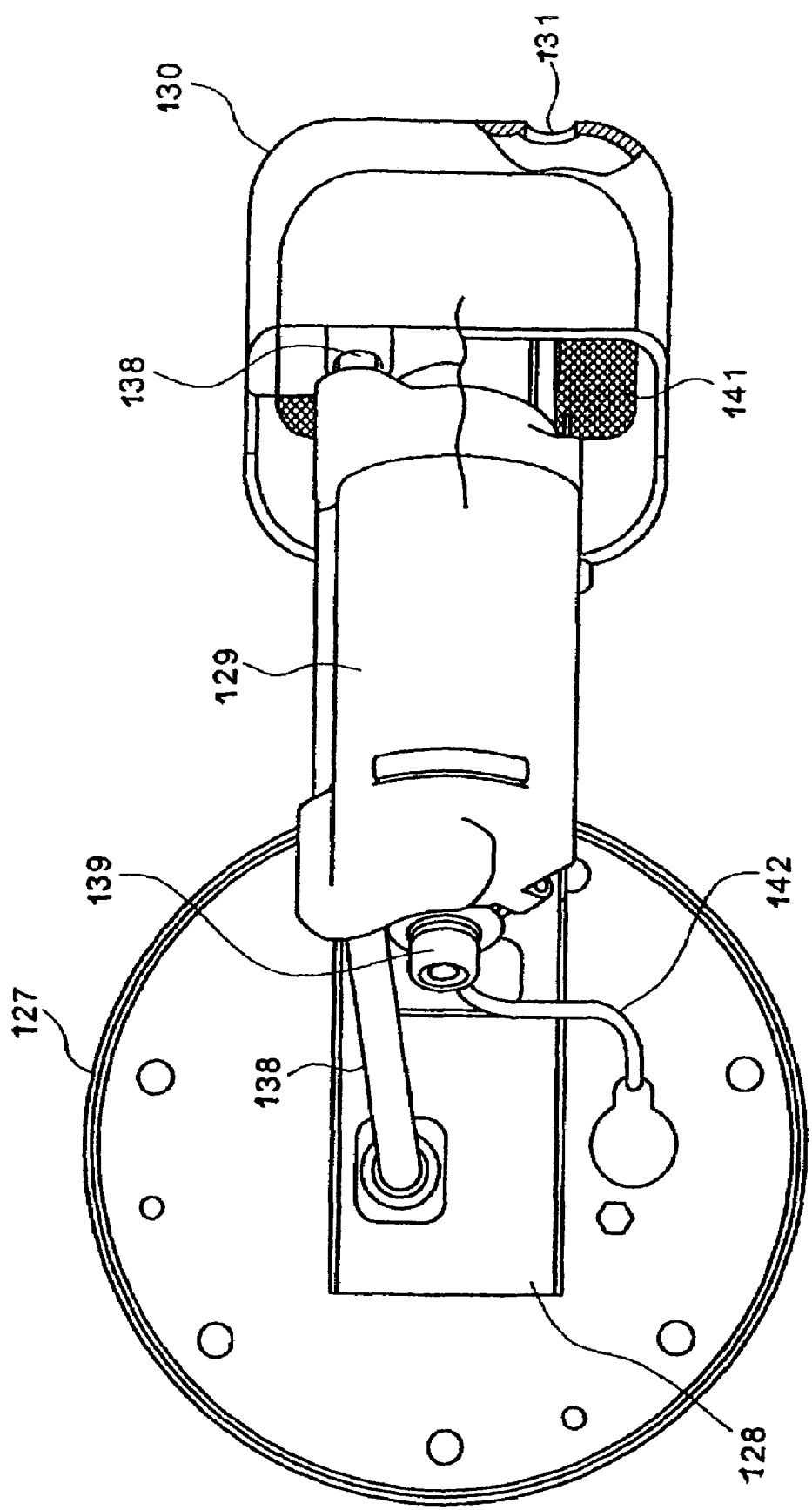
FIG. 16 is an enlarged plan view of the same.
Figure 17:
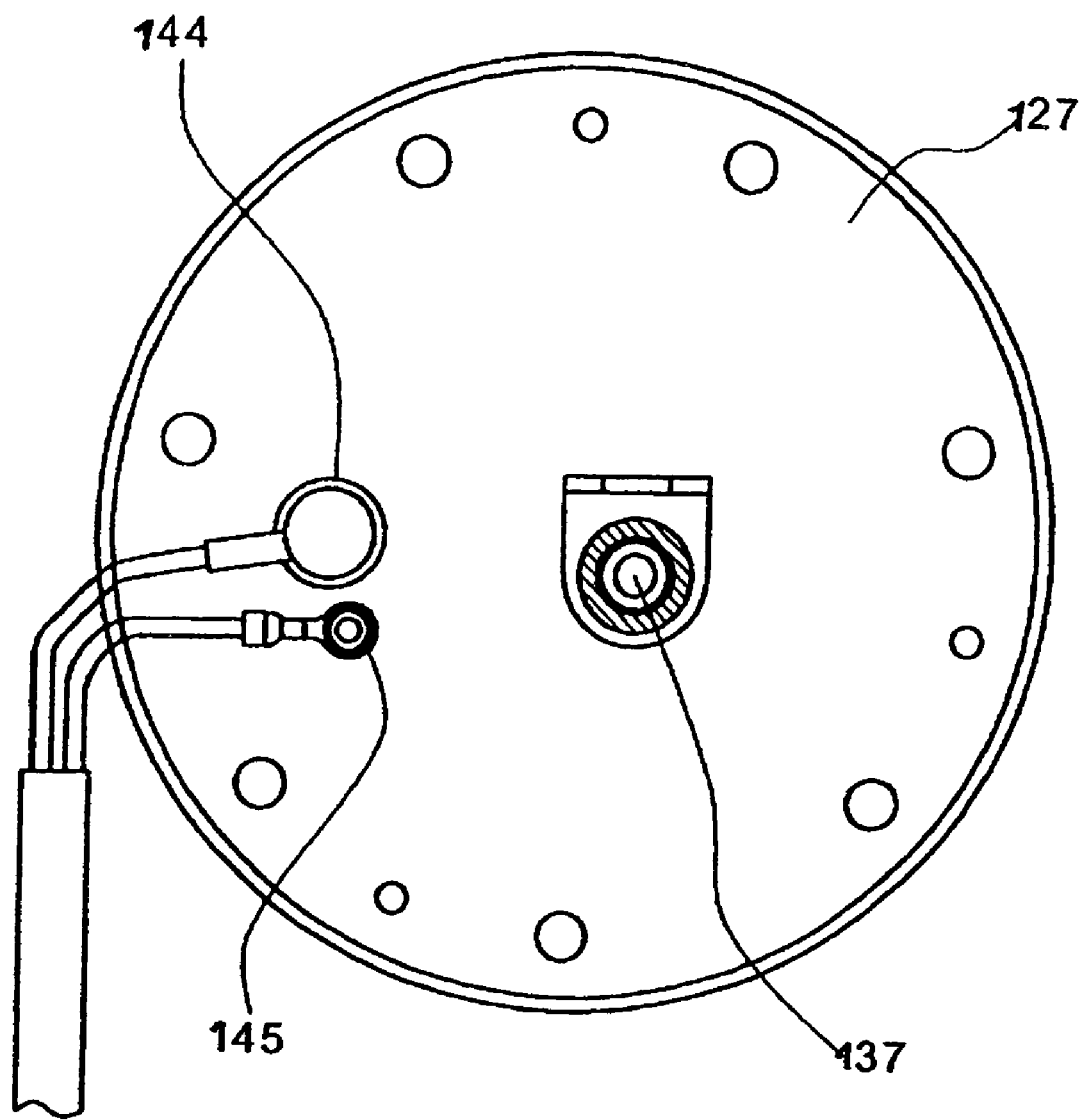
FIG. 17 is a bottom view of the base plate.

FIG. 15 is an enlarged side view of the fuel pump 118, FIG. 16 is a plan view of the same, and FIG. 17 is a bottom view of the base plate 127. In the figures, a filter 136 contained in the chamber 130 is provided at the tip end of the fuel pump main body 129 supported on the bracket 128. On the discharge side, a discharge pipe 138 connected to a fuel discharge port 137 (see FIG. 17) is provided. A pressure regulation valve 139 is provided in an intermediate portion of the discharge pipe 138, and the discharge pipe 138 is branched at the pressure regulation valve 139 into a return hose 140. An end portion of the return hose 140 is disposed so as to be terminated on a fuel keeper 141 disposed adjacent to the filter 136. Symbol 142 denotes a lead wire for supplying electric power to the fuel pump main body 129, and symbol 143 denotes an earth wire.

The chamber 130 is filled with the fuel penetrating via the fuel suction port 131, and the filter 136 and the fuel keeper 141 are immersed in the fuel. The fuel suction port 131 is so disposed as to be closed with the fuel, i.e., to be located at the lowest position, even in the case where the residual fuel amount is reduced to the reserve amount and the vehicle is inclined as above-mentioned.

The base plate 127 is provided with the fuel discharge port 137, a power feeder terminal 144, and an earth terminal 145, as shown in FIG. 17. The hose 119 extended to the fuel injection valve (not shown) is connected to the fuel discharge port 137.

At the time of operation, the fuel sucked into the fuel pump main body 129 through the filter 136 is discharged into the discharge pipe 138, and the fuel is supplied through the fuel discharge port 137 and the hose 119 to the fuel injection valve of the engine 102. When the fuel supply pressure becomes too high, the pressure regulation valve 139 operates to cause the fuel to flow from the intermediate portion of the discharge pipe 138 into the return hose 140, to be discharged onto the fuel keeper 141.

Figure 18:
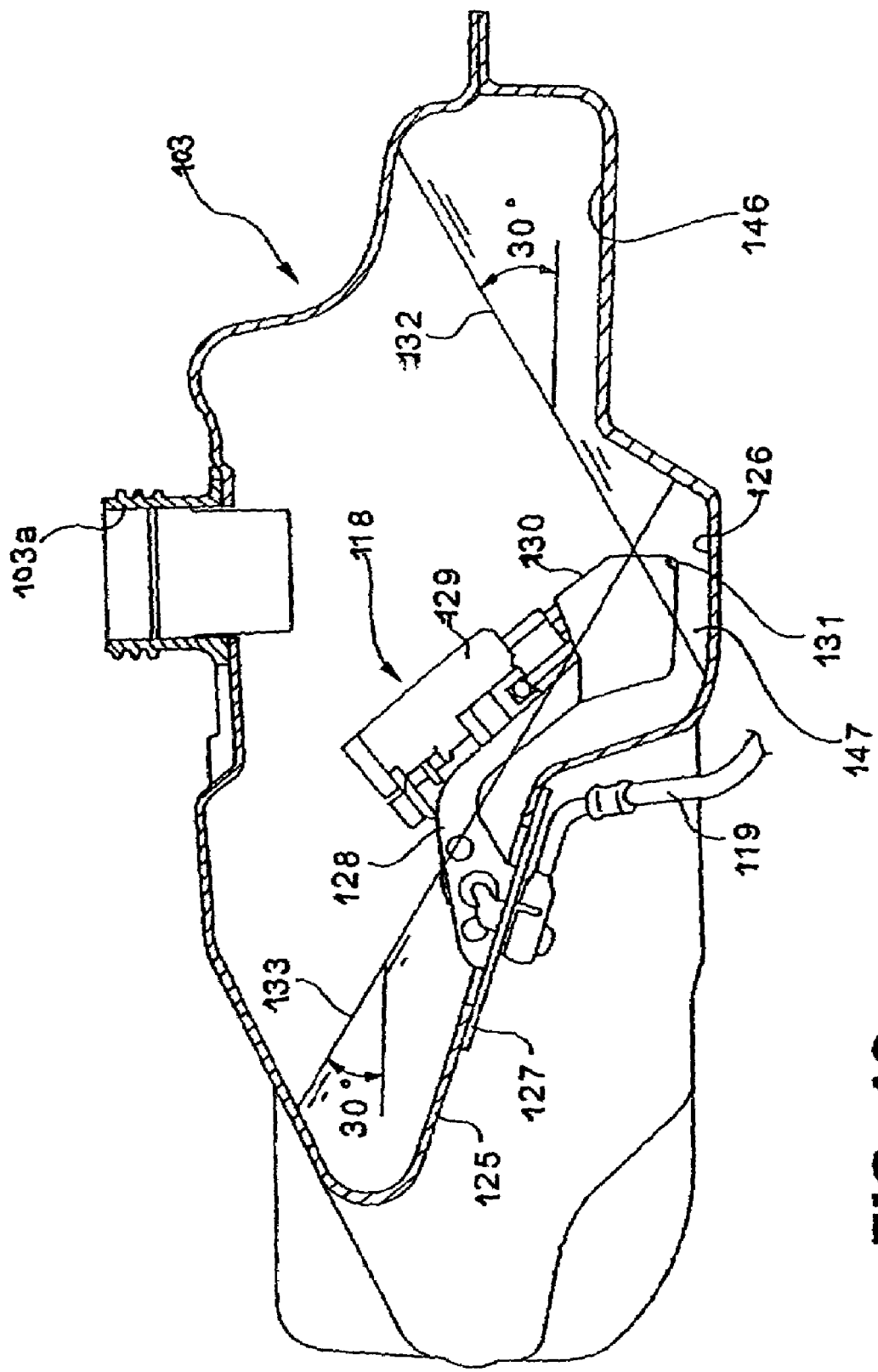
FIG. 18 is a vertical sectional view of a fuel supply system according to another embodiment of the present invention.

FIG. 18 is a sectional view showing a modified example of the fuel tank, in which the same symbols as those in FIG. 10 denote the same or equivalent portions as or to the above. In this example, another step portion 146 in continuity with the lower portion 126 is provided nearer to a rear portion of the vehicle. To be more specific, a wall on the rear side of the lower portion 126 is formed to be higher, and the lower portion 126 and the step portions 125 and 146 on the front and rear sides thereof form a fuel sump portion 147 deeper than the fuel tank 103 shown in FIG. 10.

The fuel sump portion 147 is not only projected downwards in shape in side view, i.e., as viewed in the direction as shown in FIG. 18, but is projected downwards at a central portion in the width direction in front view, i.e., as viewed in the vehicle body front-rear direction. In other words, the fuel sump portion 147 is in a mortar-like or funnel-like shape in which the periphery of the lower portion 126 is surrounded by step portions including the front step portion 125 and the rear step portion 146. Therefore, the residual fuel easily collects in the fuel sump portion 147. Besides, the fuel suction port 131 is located in the fuel sump portion 147. Therefore, even when the vehicle body is inclined in the front-rear direction and the left-right direction, the fuel pump 118 can pick up and discharge the residual fuel.

Particularly, in the case of an ATV expected to ascend and descend steep slopes and to perform traverse running on slopes, the fuel can be stably supplied to the engine even when the residual fuel amount is small.

Figure 19:
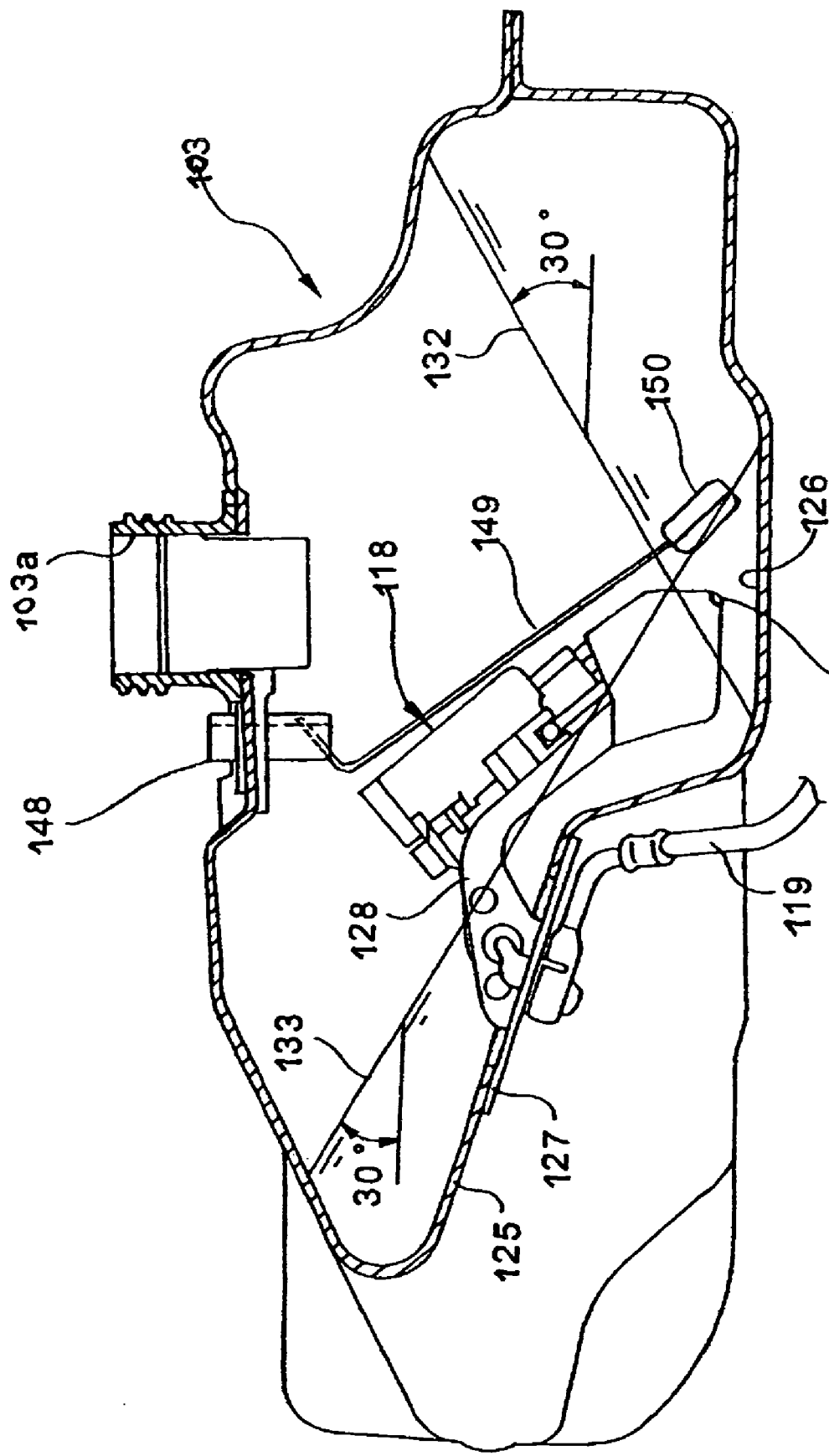
FIG. 19 is a sectional view of a fuel tank comprising a residual fuel amount meter.

FIG. 19 is a sectional view of a fuel tank provided with a residual fuel amount meter, in which the same symbols as those in FIG. 10 denote the same or equivalent portions as or to the above. A residual amount meter 148 is provided on the upper wall of the fuel tank 103, adjacently to the fuel supply port 103a. The residual amount meter 148 is disposed with its center shifted to the vehicle body front right side relative to the fuel supply port 103a. The residual amount meter 148 comprises an arm 149 extending downwards, and a float 150 attached to the tip end of the arm 149. The position of the float 150 varies following up to the fuel level of the residual fuel. The position of the float 150 is converted into a movement of a pointer (described later) of the residual amount meter 148 provided at the base of the arm 149, and the residual amount is indicated by the pointer.

Figure 20:
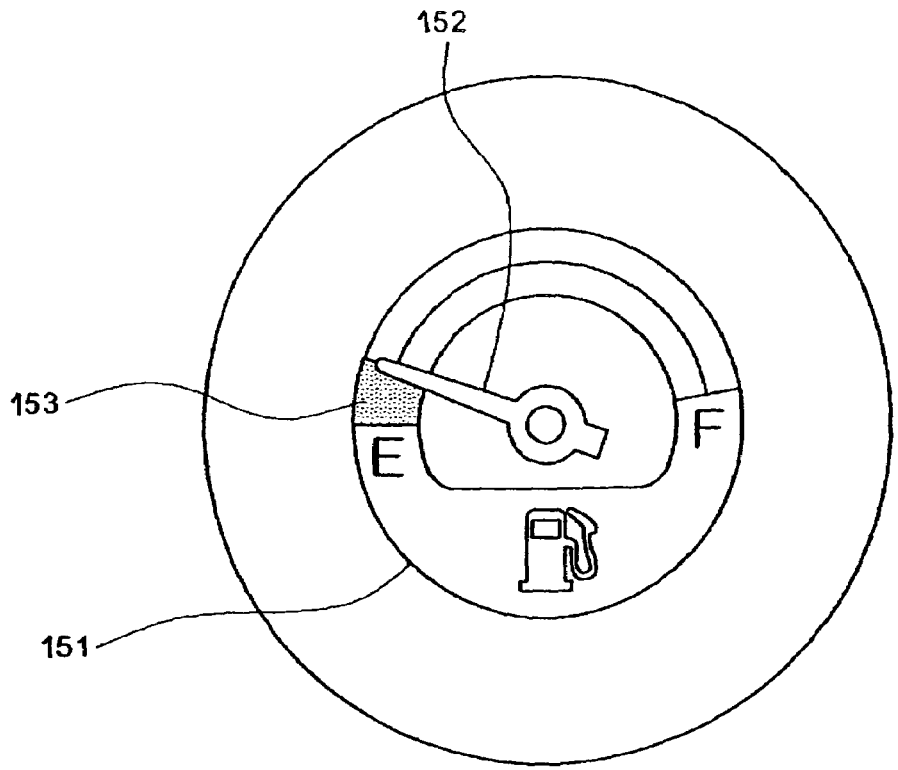
FIG. 20 is a plan view showing one embodiment of an indication portion of the residual amount meter.

FIG. 20 is a plan view showing one example of an indication portion of the residual amount meter 148. In FIG. 20, a character E indicating the position indicating that the fuel tank is empty and a character F indicating the position indicating that the fuel tank is substantially filled up with the fuel are described on the indication portion 151, and the pointer 152 points a position corresponding to the residual fuel amount, between the characters E and F. The region ranging from the point position indicating the empty condition by the character E to a point position deviated a little toward the character F side, i.e., a reserve region 153 is indicated by red color, for example. When the region 153 is pointed by the pointer 152, the residual fuel amount is not more than the reserve amount.

Figure 21:
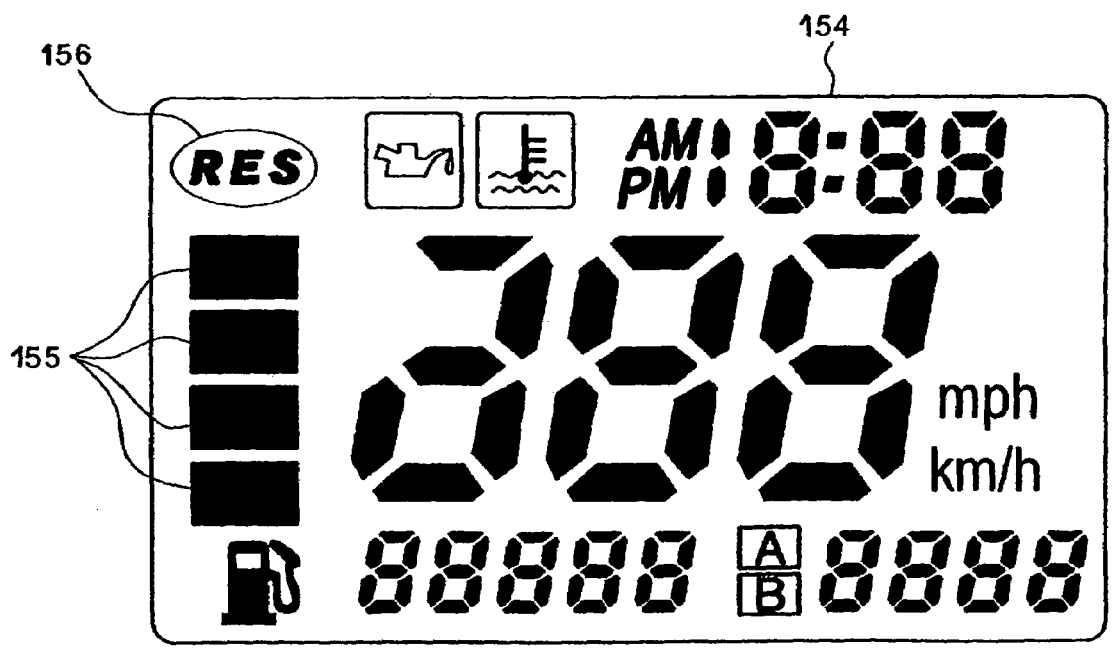
FIG. 21 is a view showing another embodiment of the residual amount meter.

FIG. 21 is a view showing another example of the residual amount meter. The example shown in FIG. 21 indicates the amount of the residual fuel as a part function of a multifunction indication panel. The indication panel 154 indicates a plurality of pieces of information on a digital basis. According to the residual amount of the fuel, a plurality of segments 155 are all turned ON when the fuel tank is filled up with the fuel, and, as the fuel amount is decreased, the number of the segments 155 turned ON is decreased. When the residual fuel amount is reduced to the reserve amount, a character set 156 indicating the reserve amount is turned ON.

FIGS. 22A and 22B show a further example of the residual amount meter. In this example, a plurality of segments 157 on an indication panel are turned ON according to the residual amount of the fuel. When the fuel tank is filled up with the fuel, all the segments 157 are turned ON as shown in FIG. 22A. When the fuel amount is reduced to the reserve amount, the segment adjacent to a character set "RES" indicating the reserve amount, of the segments 157, is made to blink as shown in FIG. 22B.

The present invention is not limited to the above-described embodiments. For example, it suffices for the fuel sump portion to be located at a roughly central portion in at least one of the width direction and the front-rear direction of the fuel tank 103. Where the fuel sump portion is located at a roughly central portion in the front-rear direction of the fuel tank, a small residual fuel amount can be well maintained at the times when the vehicle is ascending and descending slopes. On the other hand, where the fuel sump portion is located at a roughly central portion in the width direction of the fuel tank, a small residual fuel amount can be well maintained at the time when the vehicle is running on a laterally inclined surface.

In addition, it suffices that at least the fuel suction port of the fuel pump is set at the above-mentioned position; therefore, the position of supporting the fuel pump on the fuel tank is not limited to the position on the step portion 125, and can be set arbitrarily.

Figure 24:
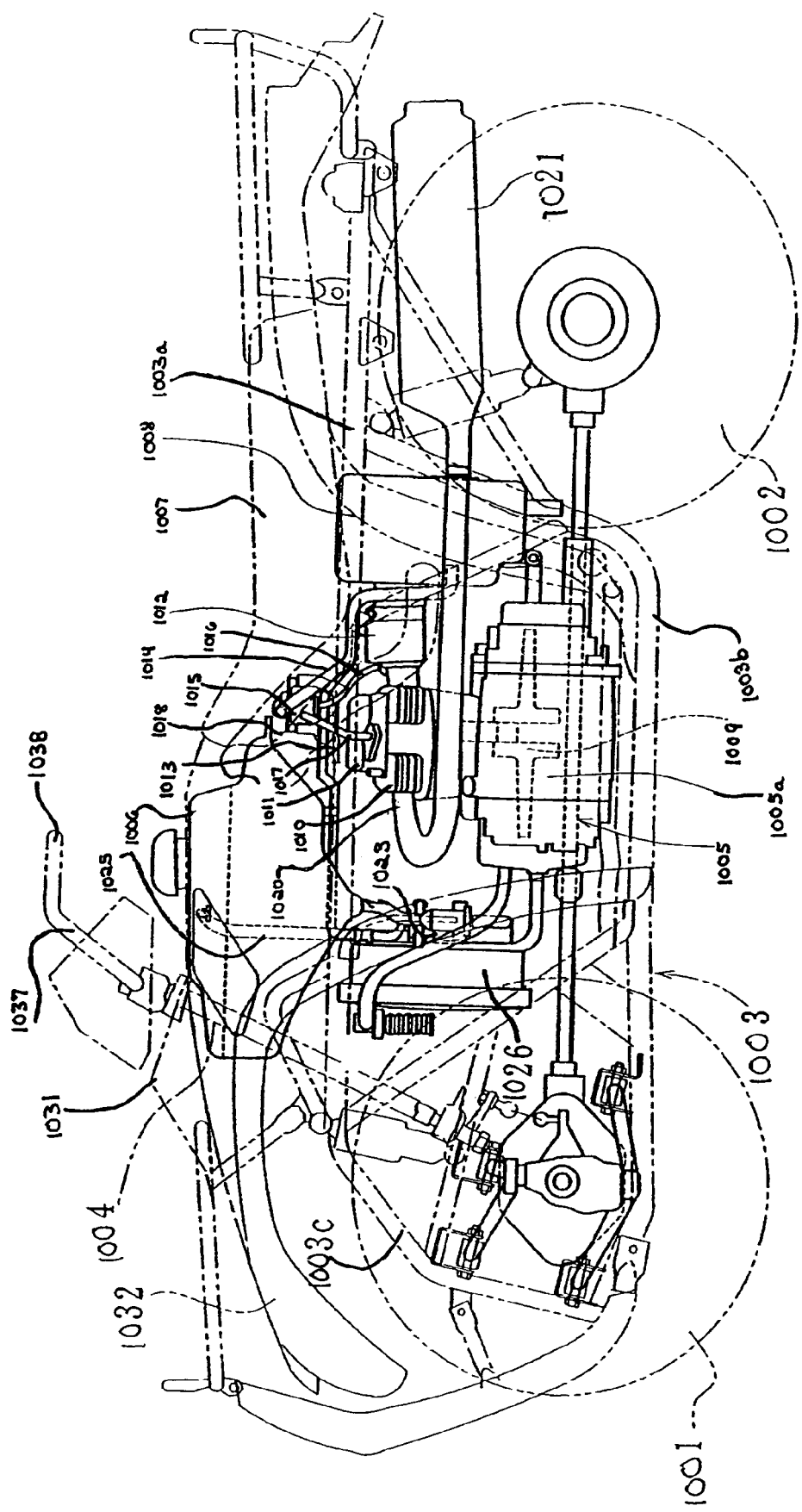
FIG. 24 is a side view of a saddle ride type four-wheel vehicle according to still another embodiment of the present invention.

FIG. 24 is a side view of a saddle ride type four-wheel vehicle according to one embodiment of the present invention. Symbol 1001 denotes front wheels, 1002 denotes rear wheels, which are disposed as left-right pairs on the left and right sides of a vehicle body frame 1003. The vehicle frame 1003 includes upper frames 1003a and lower frames 1003b on the upper and lower sides, respective left-right pairs thereof extend in the front-rear direction, and the lower frames 1003b are connected to the upper frames 1003a on the front and rear sides. Symbol 1004 denotes a steering shaft, 1005 denotes an engine, 1006 denotes a fuel tank, 1007 denotes a saddle ride type seat, and 1008 denotes an air cleaner.

The engine 1005 is a four-cycle air-cooled engine, and is of a transverse system, with its crankshaft 1009 directed in the front-rear direction. A cylinder head 1010 is provided with a cylinder head cover 1011 incorporating a valve operating mechanism in an upper portion thereof, an intake passage is opened in a rear-side surface, and a throttle body 1012 constituting a fuel injection device is connected to an opening portion of the intake passage. A clarified air discharge portion of the air cleaner 1008 disposed on the rear side of the throttle body 1012 is connected to the throttle body 1012. The air cleaner 1008 is supported on the upper frame 1003a. The fuel tank 1006 and the seat 1007 are also supported on the upper frames 1003a.

An ECU is integrated with the throttle body 1012, for performing ignition control and fuel injection control. The throttle body 1012 is supplied with clean air from the clean side of the air cleaner 1008, is supplied also with a fuel from a fuel feed tube 1013, and supplies a mixture gas into the intake passage of the cylinder head 1010.

A secondary air supply system 1015 connected to the front surface of the air cleaner 1008 through a secondary air intake hose 1114 is disposed on the upper side of the cylinder head 1010. The secondary air supply system 1015 is a secondary air valve system configured in a compact form by integrating a secondary air flow control valve and a reed valve which is a shut-off valve.

An exhaust port is provided on the front surface side of the cylinder head 1010, and the front end of an exhaust pipe 1020 is connected to the exhaust port. The exhaust pipe 1020 projects to the front side of the cylinder head 1010, is then curved into a roughly U shape, crosses a lateral side of the cylinder head 1010, extends rearward, and is connected to a muffler 1021.

The muffler 1021 is overlapped with a lateral side of an upper portion of the rear wheel 1002, and is supported on a rear portion of the upper frame 1003a. A catalyst is provided in the muffler 1021, for clarification of the exhaust gas, and, when secondary air is supplied to an exhaust port by the secondary air supply system, the amount of oxygen in the exhaust gas is increased, whereby the efficiency of clarification by the catalyst is enhanced.

A rear end portion of the exhaust pipe 1020 crosses a roughly central portion in the vertical direction of a side surface of the air cleaner 1008, and a portion of connection between a rear end portion of the exhaust pipe 1020 and a front end portion of the muffler 1021 is located in the vicinity of the rear end of the air cleaner 1008. Symbol 1005a denotes a crankcase, and an intermediate portion of the exhaust pipe 1020 is disposed substantially in parallel to the upper surface of the crankcase 1005a.

Figure 25:
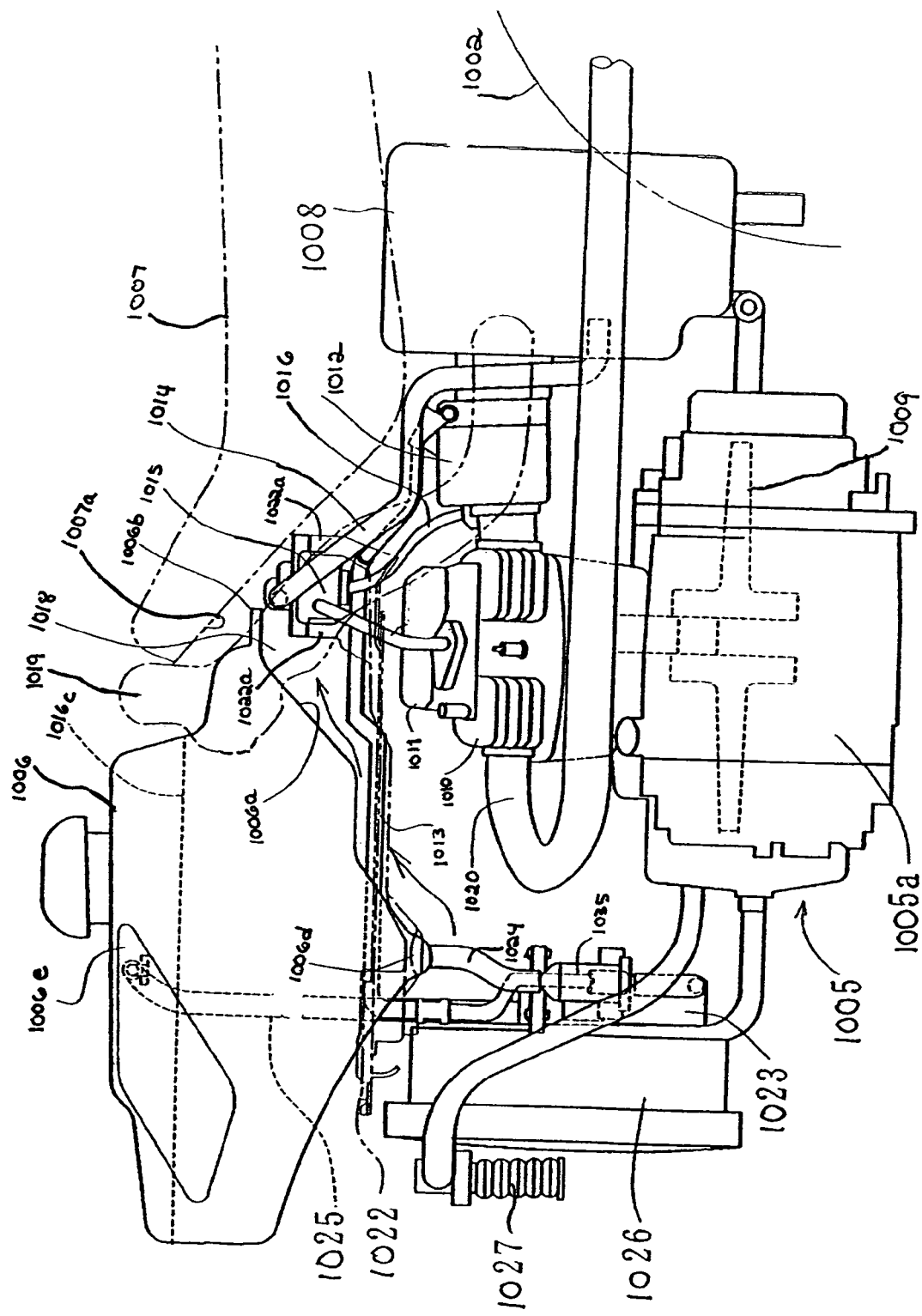
FIG. 25 is an enlarged side view of a part of the above.

As shown in FIG. 25, the secondary air supply system 1015 is operated by an engine intake negative pressure through a negative pressure pipe 1016, whereby clarified air supplied from the clean side of the air cleaner 1008 is fed as secondary air through a secondary air feed-out pipe 1017 to the exhaust port of the cylinder head 1010, thereby clarifying the exhaust gas.

The secondary air supply system 1015 is connected to the intake passage of the cylinder head 1010 through the negative pressure pipe 1016, the flow control valve controls the quantity of secondary air fed from the secondary air intake hose 1014 according to the intake negative pressure at the intake port, and the reed valve is opened and closed at predetermined negative pressure levels. When the reed valve is opened, the secondary air controlled in flow rate is supplied through the secondary air feed-out pipe 1017 to the exhaust port.

The position of the secondary air supply system 1015 is disposed in an above-cylinder space 1018 surrounded by a bottom portion rear-side portion 1006a of the fuel tank 1006, a bottom portion front-side portion 1007a of the seat 1007, and an upper portion of the cylinder head 1010. The secondary air supply system 1015 is overlapped with and bolted onto a boss 1022a formed at a rear end portion of a bottom portion plate 1022 extending as a separate body rearward from a bottom portion of the fuel tank 1006, whereby the secondary air supply system 1015 is supported.

The bottom portion rear-side portion 1006a of the fuel tank 1006 is inclined rearwardly upwards, the bottom portion front-side portion 1007a of the seat 1007 is inclined forwardly upwards on the front side, and the above-cylinder space 1018 is roughly mount-shaped in side view shown in the figure. A rear end portion of the fuel tank 1006 is an extension portion 1006b which projects substantially horizontally at a position on the upper side relative to the bottom portion plate 1022 and which reaches the vicinity of the secondary air supply system 1015.

Of the secondary air intake hose 1014, a front portion is disposed rearwardly downwards along the inclination of the bottom portion front-side portion 1007*a* of the seat 1007, an intermediate portion is curved substantially horizontally on the upper side of the throttle body 1012, and a rear portion extends vertically along the front surface of the air cleaner 1008 and is communicated with the clean side of the air cleaner 1008. Symbol 1019 denotes a snorkel, in which an intake port at the front end is located on the upper side of the rear end of the fuel tank 1006 and at the front end of the seat 1007, is disposed skewly rearward along the bottom portion front-side portion 1007*a*, and is connected to the dirty side of the air cleaner 1008.

A fuel pump 1023 is disposed, separately from the fuel tank 1006, on the front side of the engine 1005 and on the lower side of the fuel tank 1006. The fuel pump 1023 is connected through a fuel tube 1024 to a lowermost portion 1006*d* roughly funnel-shaped in side view and projecting downwards at the center of a bottom portion of the fuel tank 1006. The fuel is supplied by free fall from the fuel tank 1006 to the fuel pump 1023 through a fuel filter 1035 provided at an intermediate portion of the fuel tube 1024. The fuel pressurized by the fuel pump 1023 is supplied to the throttle body 1012 through the fuel feed tube 1013. The lowermost portion 1006*d* is located at roughly the same height as an upper portion of the cylinder head 1010 such as to be overlapped with the cylinder cover 1011 in the front-rear direction, and an upper portion of the fuel pump 1023 is located at roughly the same height as the exhaust pipe 1020, resulting in that the fuel tube 1024 is short and is disposed vertically.

The fuel feed tube 1013 extends upwards from the fuel pump 1023, is then bent roughly horizontally rearward, extends rearward while overlapping a part of the lowermost portion 1006*d* in side view, passes to the upper side of the cylinder head 1010 while being roughly angular U-shaped in side view, and intersects with the negative pressure pipe 1016, and the rear end thereof is connected to the throttle body 1012.

The fuel pump 1023 is in a roughly tubular shape with which a sub fuel tank is integrated, and is disposed with its longitudinal direction directed vertically. The fuel tank 1006 is a synthetic resin-made body in which the fuel pump 1023 can be integrally contained with difficulty, but such a configuration ensures that the fuel pump 1023 can be disposed separately from the fuel tank 1006. A return tube 1025 for exclusive use for returning a vapor is extended roughly vertically upwards from an upper portion of the fuel pump 1023, and an upper end portion of the return tube 1025 is mounted in a recessed portion 6*e* provided at an upper portion of the fuel tank 1006 and is communicated with a space on the upper side relative to the fuel level 1006*c* at the time when the fuel tank 1006 is filled up with the fuel.

Symbol 1026 denotes a cooling fan for cooling the engine, and the fuel pump 1023 is disposed on the rear side of the cooling fan 1026. The cooling fan 1026 performs forced cooling of the oil cooler 1027 disposed on the front side thereof and the engine 1005 on the rear side. The oil cooler 1027 is so configured that the engine oil in the crankcase 1005*a* is circulated therethrough.

In addition, the cooling fan 1026 is located on the front side of and on the lower side relative to the secondary air supply system 1015, and the fuel tank 1006 is present between the cooling fan 1026 and the secondary air supply system 1015. In this case, part of the cooling airflow fed toward the vehicle body rear side from the cooling fan 1026 toward the engine 1005 is guided by the bottom portion rear-side portion 1006*a* of the fuel tank 1006 inclined rearwardly upwards in the above-cylinder space 1018, to flow into the vicinity of the secondary air supply system 1015.

Figure 26:
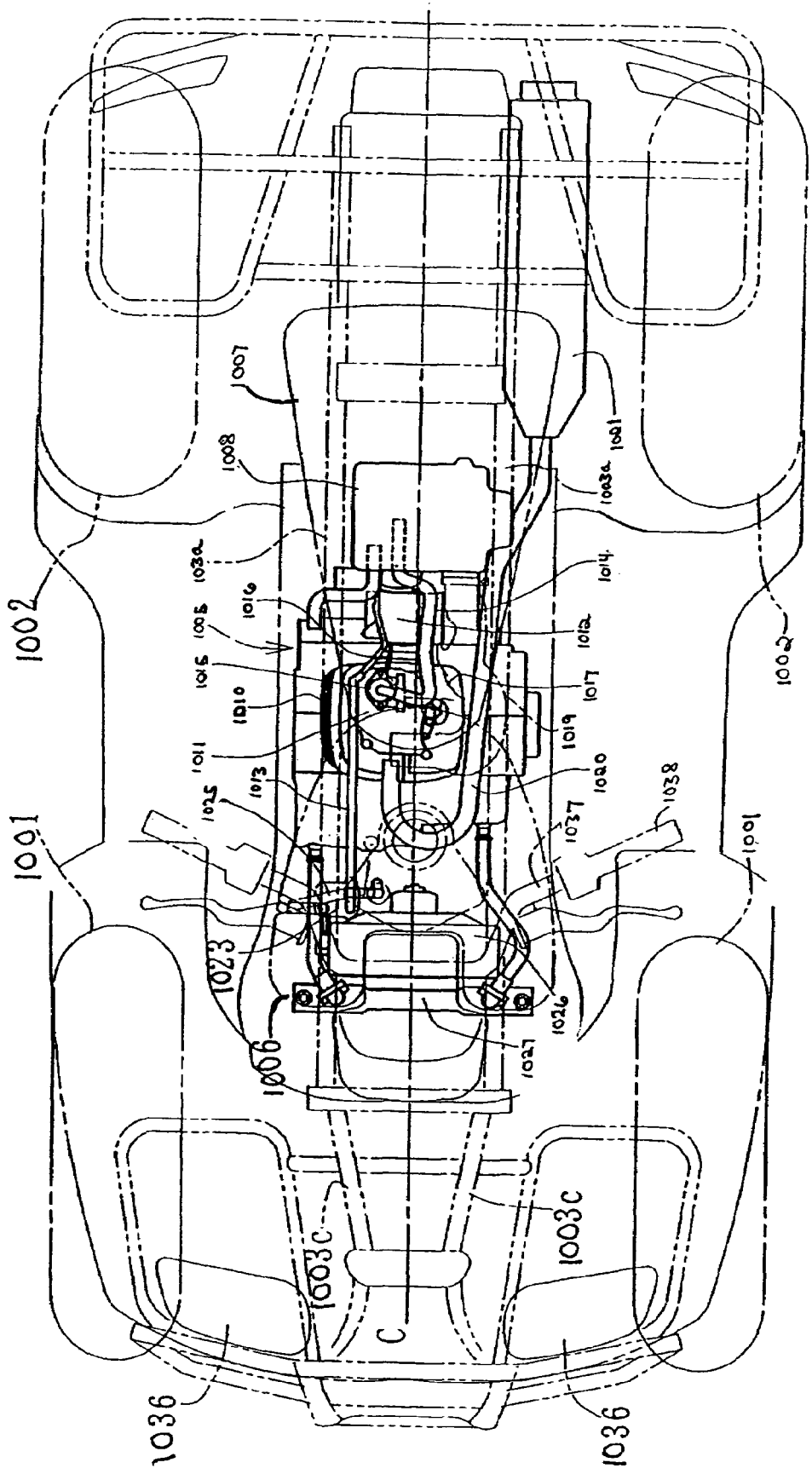
FIG. 26 is a plan view of a saddle ride type four-wheel vehicle according to one embodiment of the present invention.
Figure 27:
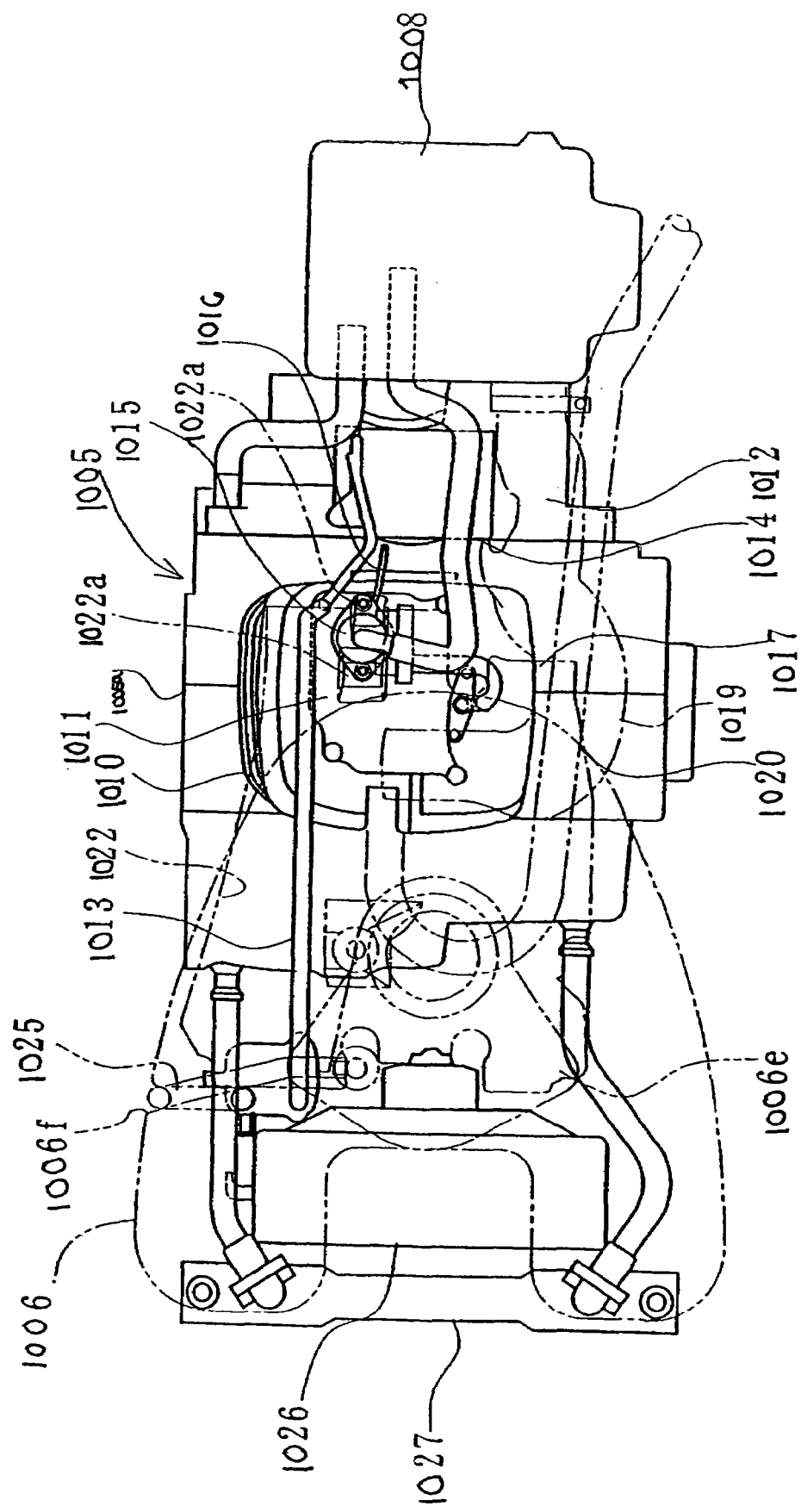
FIG. 27 is an enlarged plan view of a part of the above.

FIG. 26 is a plan view of a saddle ride type four-wheel vehicle according to one embodiment of the present invention, and FIG. 27 is an enlarged plan view of a part thereof. In these figures, the secondary air supply system 1015 is located roughly in the vicinity of the vehicle body center C. The negative pressure pipe 1016 and the air cleaner 1008 are also located roughly on the vehicle body center. The fuel pump 1023 is disposed at a position deviated to the vehicle body right side, and is disposed on the opposite side of the side of the exhaust pipe 1020, which is located on the left side of the cylinder head 1010, whereby the fuel pump 1023 is located at such a position as to be remote from the exhaust pipe 1020 and be less likely to be thermally influenced. The return tube 1025 is vertically laid out in the state of being located in a recessed groove 1006*f* formed in a side surface of the fuel tank 1006 (FIG. 27). In FIG. 26, symbol 1036 denotes headlights, 1037 denotes steering handle bars, and 1038 denotes steering handle grips.

Figure 28:
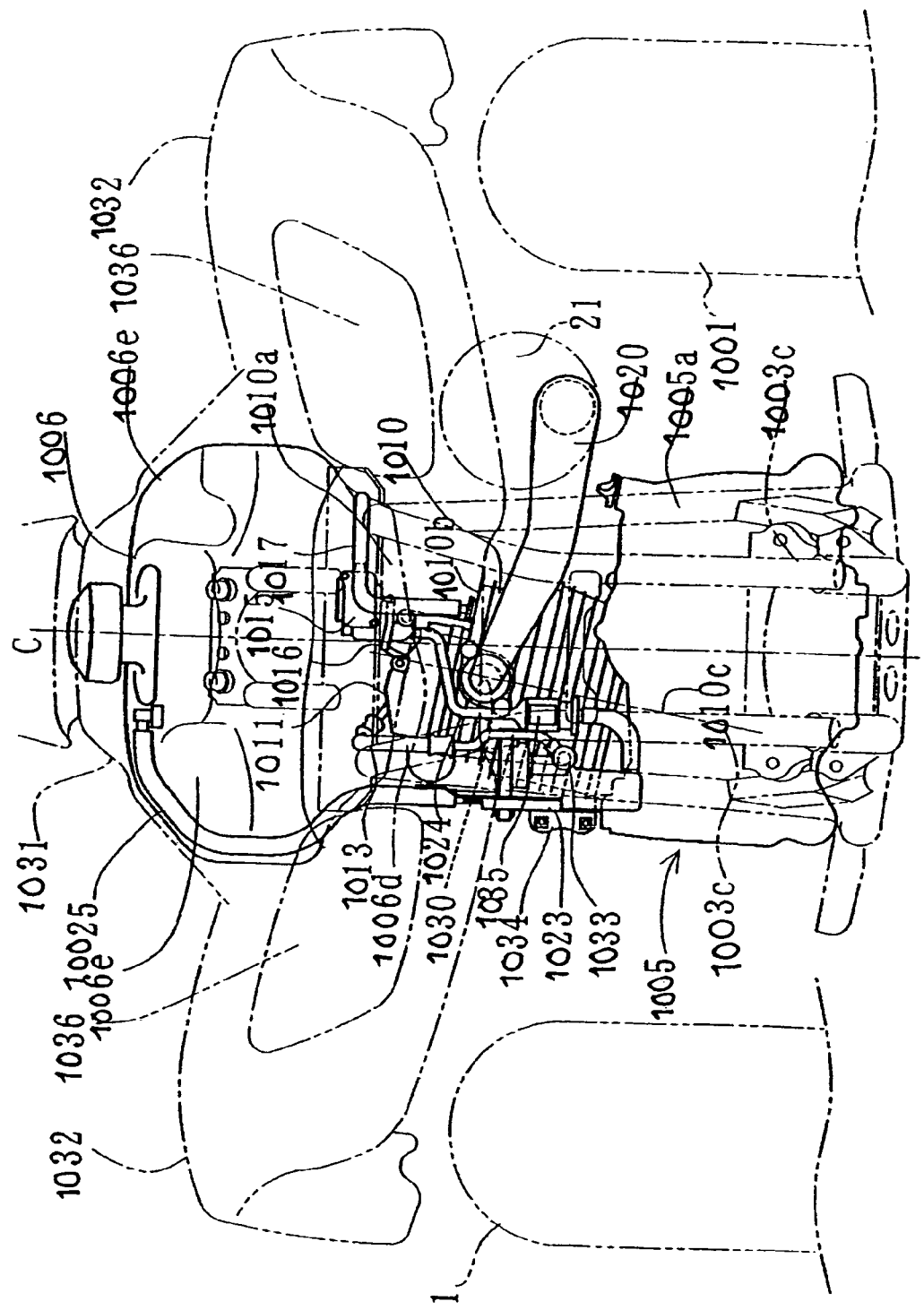
FIG. 28 is a view showing a part, as viewed from the vehicle body front side.

FIG. 28 is a view showing the vehicle body front side. The cylinder head 1010 has its cylinder axis 1010*c* inclined to the vehicle body left side, whereby the cylinder head 1010 as a whole has its upper side inclined to the vehicle body left side. The cylinder cover 1011 is disposed at a position deviated to the vehicle body right side at an upper portion of the cylinder head 1010, and the cylinder head cover 1011 and the secondary air supply system 1015 are overlapped with the back side of a bottom portion of the fuel tank 1006 in front view as shown in the figure.

The exhaust port 1030 is located to be slightly deviated to the vehicle body right side relative to the vehicle body center C. The exhaust pipe 1020 extends therefrom skewly downwards toward the vehicle body left side, and it extends roughly horizontally on a lateral side of the cylinder head 1010. The fuel pump 1023 is disposed on the vehicle body right side, i.e., on the opposite side of the side of inclination of the cylinder head 1010 and the side of layout of an intermediate portion of the exhaust pipe 1020, is disposed on the outside of and roughly in parallel (in front view as shown in the figure) to a front portion 1003*c* of the vehicle body frame 1003. The fuel pump 1023 is mounted to a bracket 1034 extending downwards from the upper frame 1003*a*.

The return tube 1025 extends roughly vertically upwards from the fuel pump 1023, is once curved toward the vehicle body right side in the vicinity of a bottom portion of the fuel tank 1006, passes through a recessed portion formed in a side surface of the fuel tank 1006, and is extended upwards in the state of being comparatively less curved, and an upper end portion thereof is curved to the vehicle body inner side, to be overlapped with an upper portion of the fuel tank 1006.

Symbol 1031 denotes a front cover for covering an upper portion of a vehicle body front portion inclusive of the fuel tank 1006, and 1032 denotes a front fender integral with the front cover 1031.

Figure 29:
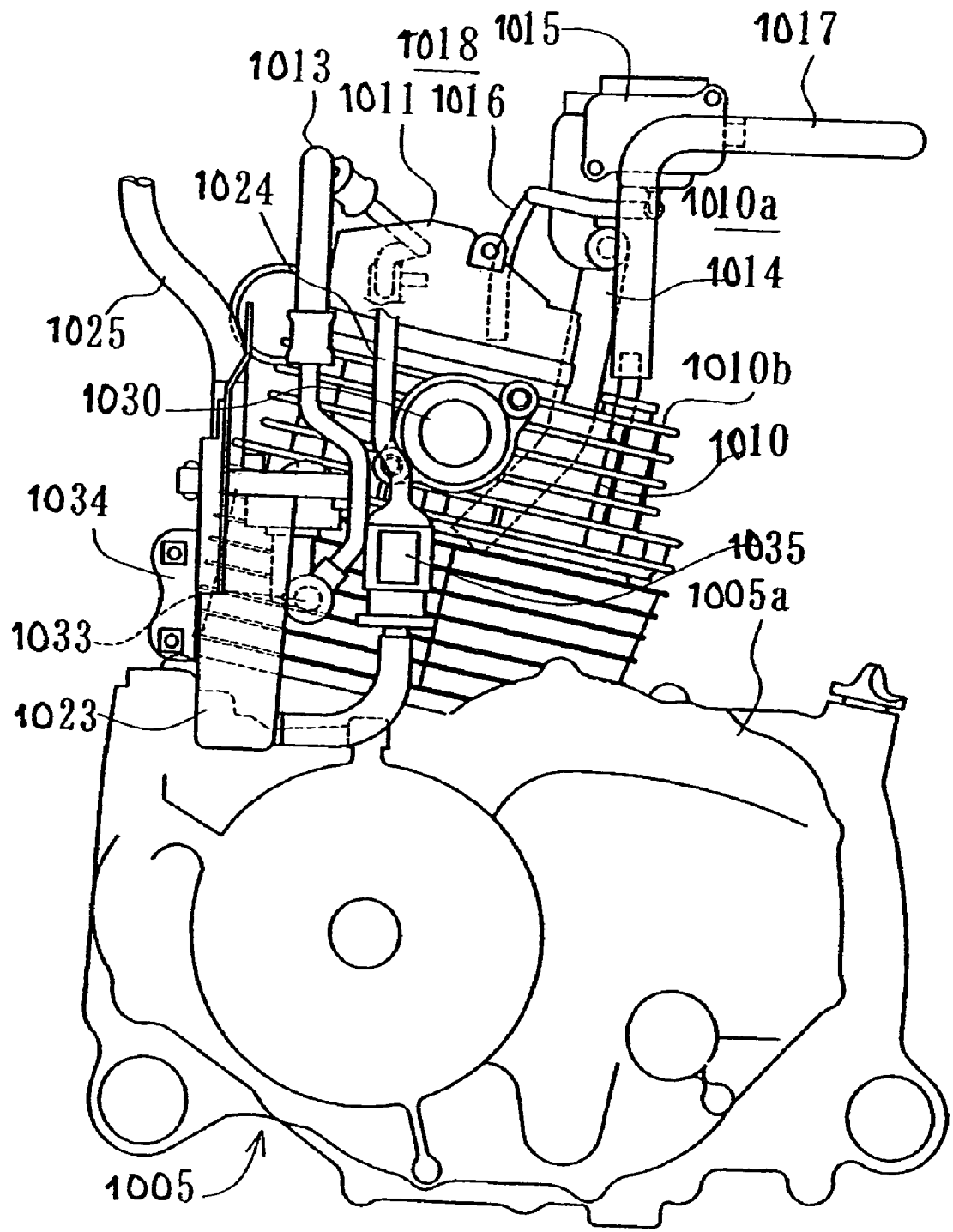

FIG. 29 is a view showing the layout of the engine 1005, the secondary air supply system 1015 and the fuel pump 1023, as viewed from the vehicle body front side. The left side of the cylinder head cover 1011 is stepped to form an above-step-portion space 1010*a* where the upper surface of the cylinder head 1010 is exposed. The above-step-portion space 1010*a* is a part of the above-cylinder space 1018, and the secondary air supply system 1015 is disposed in this space.

The secondary air intake pipe 1014 extends downwards through the above-step-portion space 1010*a* from the inside surface of the secondary air supply system 1015.

The negative pressure pipe 1016 extends roughly horizontally toward the vehicle body center from a bottom portion of the secondary air supply system 1015, is bent downwards nearly at the vehicle body center, is overlapped with the back side of the cylinder head cover 1011, and is connected to the intake passage located on the opposite side of the exhaust port 1030.

The secondary air feed-out pipe 1017 extends roughly horizontally to a lateral side from the outside surface of the secondary air supply system 1015, is curved in a roughly U shape, returns to the position for overlapping the secondary air supply system 1015 in front view, is curved downwards therefrom, and extends downwards. A lower end portion of the secondary air feed-out pipe 1017 enters into the cylinder head 1010 via an upper-side exposed portion 1010b of the cylinder head 1010, and is connected to the vicinity of the exhaust port 1030.

The fuel pump 1023 is located on the right front side of the front surface of the cylinder head 1010, the fuel feed tube 1013 connected to a discharge-side joint 1033 thereof extends upward on the front side of the front surface of the cylinder head 1010, is curved on the upper side of the cylinder head cover 1011 to extend rearward, is bent downwards on the back side of the cylinder head cover 1011, and is connected to the throttle body 1012. Symbol 1034 denotes a support bracket for the fuel pump 1023.

In the next place, functions of this embodiment will be described. As shown in FIGS. 24 and 25, the secondary air supply system 1015 is formed as a body separate from the engine 1005, is disposed in the above-cylinder space 1018 on the upper side of the engine 1005, and the above-cylinder space 1018 is formed by utilizing the lower side of the bottom portion front-side portion 1007a of the seat 1007 inclined forwardly upwards. Therefore, it is possible for securing a space for laying out the secondary air supply system 1015. In addition, it can be ensured that the secondary air supply system 1015 is less likely to be thermally influenced by the engine 1005, and is laid out in the vicinity of the engine 1005 so that a piping can be made shorter. Moreover, with the above-cylinder space 1018 covered by a vehicle body cover continuous with the front cover 1031, it is easy to dispose the secondary air supply system 1015 so that it is difficult for the secondary air supply system 1015 to be seen from the exterior.

Besides, an upper portion of the above-cylinder space 1018 is formed in a roughly mount-like shape by the bottom portion rear-side portion 1006a of the fuel tank 1006 inclined forwardly downwards and the bottom portion front-side portion 1007a of the seat 1007 inclined forwardly upwards, so that the above-cylinder space 1018 is roughly mount-shaped in side view, and a comparatively large space can be formed. Therefore, it is made easier for air to flow in the above-cylinder space 1018, whereby the cooling efficiency for the secondary air supply system 1015 is enhanced, and it is possible to further reduce the influence of the heat coming from the engine 1005. Particularly, the possibility of the thermal influence can be reduced notwithstanding the structure in which the periphery of the four-wheel buggy car is surrounded by the vehicle body cover so that direct cooling thereof by running airflow cannot be expected.

Moreover, since the bottom portion rear-side portion 1006a of the fuel tank 1006 is an inclined surface inclined forwardly downwards, it is easy for air to flow rearwardly upwards along the bottom portion of the fuel tank located on the upper side of the above-cylinder space 1018, so that the flow of air can be guided to the secondary air supply system 1015, whereby the cooling efficiency for the secondary air supply system 1015 can be enhanced. In addition, since the rear end portion of the fuel tank 1006 is the extension portion 1006b reaching the vicinity of the secondary air supply system 1015, air can be led to the secondary air supply system 1015 more securely.

Further, since the secondary air supply system 1015 is located on the rear side of the cooling fan 1026 provided on the front side of the engine 1005, the secondary air supply system 1015 can be cooled by utilizing the cooling airflow generated by the cooling fan 1026, whereby the thermal influence can be reduced further. In this case, the bottom portion rear-side portion 1006a of the fuel tank 1006 can serve as a guide for the cooling airflow. Moreover, since the secondary air supply system 1015 is not located between the cooling fan 1026 and the engine 1005, the cooling efficiency for the engine 1005 can be prevented from being lowered.

Incidentally, the present invention is not limited to the above-described embodiment, and various modifications and applications are possible within the principle of the invention. For example, the present invention is applicable also to saddle ride type vehicles of other types (e.g., motorcycles.) Also, the engine may be of the water cooled type; in this case, the cooling fan 1026 is used for cooling a radiator.

We claim:

1. A saddle ride four-wheel all-terrain vehicle having an electronic control fuel injection system in a fuel supply system for an air-cooled engine mounted thereon, said vehicle comprising:

a pair of front wheels having a rotational center axis defined therebetween;

a vehicle body frame including left-right pairs of upper pipes and lower pipes disposed at upper and lower portions of the body frame and extending in the front-rear direction of the vehicle;

a fuel tank disposed above a front side portion of the upper pipe of the vehicle frame;

a cooling fan for blowing air to the engine is located below the upper frame and between the rotational axis of the front wheels and the engine;

a fuel sump portion provided at a bottom center portion of the fuel tank and extending to a space located beneath the upper pipes of the vehicle frame and behind the cooling fan in the rear direction of the vehicle;

a fuel pump disposed on a rear side of the vehicle relative to the rotational center axis of front wheels and on a front side of the vehicle relative to said engine, and a throttle body is disposed on a rear side of a cylinder head of said engine, wherein the fuel sump portion is approximately V-shaped in vehicle body side view and in vehicle body front view, the fuel pump is disposed between the cooling fan and said engine, and said engine is a traverse layout engine.

2. The saddle ride four-wheel vehicle according to claim 1, wherein said fuel pump, including a fuel take-out port of a fuel tank, is located in an area defined below a front extension line and a rear extension line of two fuel levels having a front-rear inclination of about 30°.

3. The saddle ride four-wheel vehicle according to claim 1, wherein said fuel pump, including a fuel take-out port of a fuel tank, is located in an area defined below a front extension line and a rear extension line of two fuel levels having a left-right inclination of about 15°.

* * * * *